US008261950B2

(12) United States Patent
Cittadino et al.

(10) Patent No.: US 8,261,950 B2

(45) Date of Patent: Sep. 11, 2012

(54) PUMPING DISPENSER

(75) Inventors: Antonio M. Cittadino, Appleton, WI (US); Carolyn C. Byl, Atlanta, GA (US); Matthew T. Wilcox, Oshkosh, WI (US); Alan P. Paal, New Franken, WI (US); Gregory D. Budz, Sobieski, WI (US); Robert W. Cornell, Rothschild, WI (US)

(73) Assignee: Georgia-Pacific Consumer Products LP, Atlanta, GA (US)

( * ) Notice: Subject to any disclaimer, the term of this patent is extended or adjusted under 35 U.S.C. 154(b) by 967 days.

(21) Appl. No.: 12/254,358

(22) Filed: Oct. 20, 2008

(65) Prior Publication Data

US 2009/0101671 A1 Apr. 23, 2009

Related U.S. Application Data

(60) Provisional application No. 60/981,621, filed on Oct. 22, 2007.

(51) Int. Cl.
*G01F 11/00* (2006.01)

(52) U.S. Cl. .... 222/321.7; 222/63; 222/156; 222/181.1; 222/181.3; 222/183; 222/325

(58) Field of Classification Search .................... 222/23, 222/52, 63, 333, 181.3, 181.2, 183, 181.1, 222/325, 385, 105, 321.7, 156–158; 40/299.1, 40/299.01

See application file for complete search history.

(56) References Cited

U.S. PATENT DOCUMENTS

| | | | | | |
|---|---|---|---|---|---|
| 2,187,868 | A | | 1/1940 | Sweitzer | |
| 2,898,009 | A | | 8/1959 | Green | |
| 3,273,752 | A | | 9/1966 | Horeczky | |
| 3,327,901 | A | | 6/1967 | Yerkovich | |
| 3,419,188 | A | | 12/1968 | Matchett | |
| 3,434,628 | A | | 3/1969 | Ceraldi | |
| 3,446,405 | A | | 5/1969 | McCray | |
| 3,719,000 | A | * | 3/1973 | Finger | 40/609 |
| 3,799,218 | A | * | 3/1974 | Douglass | 141/18 |
| 3,803,738 | A | * | 4/1974 | Weiss | 40/306 |
| 3,940,938 | A | | 3/1976 | Durham et al. | |
| 4,030,665 | A | | 6/1977 | Koyama | |
| 4,160,512 | A | * | 7/1979 | Cleland | 222/56 |
| 4,349,131 | A | | 9/1982 | Arabian | |
| 4,413,649 | A | | 11/1983 | Rodd et al. | |
| 4,489,766 | A | | 12/1984 | Montada | |

(Continued)

FOREIGN PATENT DOCUMENTS

DE 4029462 A1 3/1991

(Continued)

OTHER PUBLICATIONS

International Search Report and Written Opinion for PCT/US2008/080602 mailed Jul. 9, 2009.

(Continued)

*Primary Examiner* — Frederick C. Nicolas

(74) *Attorney, Agent, or Firm* — Deborah K. Butler; Georgia-Pacific LLC

(57) ABSTRACT

A device for dispensing a flowable material is disclosed. The device includes a container holding the flowable material therein and a pumping assembly attached to the container. The pumping assembly includes a pump and a placard portion configured for displaying viewable information thereon associated with the flowable material.

13 Claims, 19 Drawing Sheets

U.S. PATENT DOCUMENTS

| | | | | |
|---|---|---|---|---|
| 4,523,692 | A * | 6/1985 | Lemkin | 220/788 |
| 4,573,612 | A | 3/1986 | Maddison et al. | |
| 4,621,749 | A | 11/1986 | Kanfer | |
| 4,722,372 | A | 2/1988 | Hoffman et al. | |
| 4,730,550 | A | 3/1988 | Bramstedt et al. | |
| 4,828,146 | A * | 5/1989 | Stein | 222/1 |
| 4,905,873 | A | 3/1990 | Loesel, Jr. et al. | |
| 4,917,265 | A | 4/1990 | Chiang | |
| 4,921,131 | A | 5/1990 | Binderbauer et al. | |
| 4,921,150 | A | 5/1990 | Lagergren et al. | |
| 4,938,384 | A | 7/1990 | Pilolla et al. | |
| 4,946,070 | A | 8/1990 | Albert et al. | |
| 4,967,935 | A | 11/1990 | Celest | |
| 4,989,755 | A | 2/1991 | Shiau | |
| 5,014,880 | A | 5/1991 | Loesel, Jr. et al. | |
| 5,040,317 | A * | 8/1991 | Kadjevich | 40/324 |
| 5,105,992 | A | 4/1992 | Fender et al. | |
| 5,165,577 | A | 11/1992 | Ophardt | |
| 5,184,655 | A * | 2/1993 | Fell | 141/392 |
| 5,186,360 | A | 2/1993 | Mease et al. | |
| D338,585 | S | 8/1993 | Bell et al. | |
| 5,235,214 | A | 8/1993 | Vuong et al. | |
| 5,248,066 | A | 9/1993 | Olson et al. | |
| 5,251,149 | A * | 10/1993 | Williams et al. | 702/46 |
| 5,255,822 | A | 10/1993 | Mease et al. | |
| D341,741 | S | 11/1993 | Allen et al. | |
| D341,875 | S | 11/1993 | Allen et al. | |
| 5,265,772 | A | 11/1993 | Bartasevich et al. | |
| 5,271,530 | A | 12/1993 | Uehira et al. | |
| 5,282,552 | A | 2/1994 | Ophardt | |
| 5,289,952 | A | 3/1994 | Gueret | |
| 5,299,713 | A | 4/1994 | Saitoh | |
| 5,305,915 | A | 4/1994 | Kamysz et al. | |
| 5,305,916 | A | 4/1994 | Suzuki et al. | |
| D350,665 | S | 9/1994 | Ophardt | |
| 5,344,047 | A | 9/1994 | Chen | |
| 5,370,267 | A | 12/1994 | Schroeder | |
| 5,373,970 | A | 12/1994 | Ophardt | |
| 5,431,309 | A | 7/1995 | Ophardt | |
| 5,443,236 | A | 8/1995 | Bell et al. | |
| 5,443,569 | A | 8/1995 | Uehira et al. | |
| 5,445,288 | A | 8/1995 | Banks | |
| 5,465,877 | A | 11/1995 | Bell et al. | |
| 5,477,984 | A | 12/1995 | Sayama et al. | |
| 5,489,044 | A | 2/1996 | Ophardt | |
| 5,492,247 | A | 2/1996 | Shu et al. | |
| 5,507,413 | A | 4/1996 | Chen | |
| D375,220 | S | 11/1996 | Copeland et al. | |
| D378,035 | S | 2/1997 | Ophardt | |
| 5,618,335 | A * | 4/1997 | Pink et al. | 96/205 |
| 5,625,659 | A | 4/1997 | Sears | |
| 5,638,989 | A * | 6/1997 | Ophardt et al. | 222/105 |
| D392,136 | S | 3/1998 | Ross et al. | |
| 5,779,104 | A | 7/1998 | Reidel | |
| 5,781,942 | A | 7/1998 | Allen et al. | |
| 5,810,201 | A | 9/1998 | Besse | |
| 5,829,636 | A | 11/1998 | Vuong et al. | |
| 5,906,299 | A | 5/1999 | Hagleitner | |
| 5,944,227 | A | 8/1999 | Schroeder et al. | |
| D416,417 | S | 11/1999 | Ross et al. | |
| 5,992,698 | A | 11/1999 | Copeland et al. | |
| 5,996,851 | A | 12/1999 | Dolan et al. | |
| 6,036,056 | A | 3/2000 | Lee et al. | |
| 6,053,364 | A | 4/2000 | van der Heijden | |
| 6,065,639 | A | 5/2000 | Maddox et al. | |
| 6,068,162 | A | 5/2000 | De Winter et al. | |
| 6,082,586 | A | 7/2000 | Banks | |
| 6,089,838 | A * | 7/2000 | Schoenmeyr et al. | 417/572 |
| 6,152,330 | A | 11/2000 | Polan | |
| 6,158,620 | A | 12/2000 | Polan | |
| 6,161,726 | A | 12/2000 | Parsons et al. | |
| 6,206,238 | B1 | 3/2001 | Ophardt | |
| 6,209,184 | B1 | 4/2001 | Copeland et al. | |
| 6,209,752 | B1 | 4/2001 | Mitchell et al. | |
| D449,753 | S | 10/2001 | DeKoning et al. | |
| 6,325,245 | B1 | 12/2001 | Matthews | |
| 6,386,390 | B1 | 5/2002 | Tinker | |
| 6,390,329 | B1 | 5/2002 | Maddox | |
| 6,394,315 | B1 | 5/2002 | Banks | |
| 6,404,837 | B1 | 6/2002 | Thompson et al. | |
| 6,409,050 | B1 | 6/2002 | Ophardt et al. | |
| D462,218 | S | 9/2002 | DeKoning et al. | |
| 6,446,840 | B2 | 9/2002 | Ophardt et al. | |
| 6,467,651 | B1 | 10/2002 | Muderlak et al. | |
| 6,533,145 | B2 | 3/2003 | Lewis et al. | |
| 6,540,117 | B2 | 4/2003 | Powling | |
| 6,542,568 | B1 | 4/2003 | Howes, Jr. et al. | |
| 6,543,651 | B2 | 4/2003 | Lewis et al. | |
| 6,557,729 | B2 | 5/2003 | Gauthier | |
| 6,568,561 | B2 | 5/2003 | Studer et al. | |
| 6,575,334 | B2 | 6/2003 | Lewis et al. | |
| 6,575,335 | B2 | 6/2003 | Lewis et al. | |
| 6,581,801 | B2 | 6/2003 | Gauthier | |
| 6,601,736 | B2 | 8/2003 | Ophardt et al. | |
| 6,619,509 | B2 | 9/2003 | DeKoning et al. | |
| 6,626,332 | B2 | 9/2003 | Ehrensperger et al. | |
| 6,644,516 | B1 | 11/2003 | Foster et al. | |
| 6,648,179 | B2 | 11/2003 | Lewis et al. | |
| 6,651,851 | B2 | 11/2003 | Muderlak et al. | |
| D483,974 | S | 12/2003 | Reed | |
| D484,721 | S | 1/2004 | Chou | |
| 6,691,893 | B2 | 2/2004 | Gauthier | |
| 6,698,616 | B2 | 3/2004 | Hidle et al. | |
| 6,719,161 | B1 * | 4/2004 | Craig | 220/23.4 |
| 6,729,502 | B2 | 5/2004 | Lewis et al. | |
| 6,758,372 | B2 | 7/2004 | Studer et al. | |
| D493,647 | S | 8/2004 | Bowes | |
| 6,769,580 | B2 | 8/2004 | Muderlak et al. | |
| 6,783,028 | B1 * | 8/2004 | Ambrose et al. | 222/23 |
| 6,793,105 | B1 | 9/2004 | Ouyoung | |
| 6,820,770 | B2 | 11/2004 | Makino et al. | |
| 6,830,557 | B2 | 12/2004 | Paul | |
| 6,923,346 | B2 | 8/2005 | Foster et al. | |
| 6,929,150 | B2 | 8/2005 | Muderlak et al. | |
| 6,956,498 | B1 | 10/2005 | Gauthier et al. | |
| 6,957,751 | B2 | 10/2005 | Ophardt | |
| 7,004,356 | B1 | 2/2006 | Sayers | |
| 7,086,567 | B1 * | 8/2006 | Ciavarella et al. | 222/95 |
| 7,191,920 | B2 | 3/2007 | Boll et al. | |
| 7,606,011 | B2 * | 10/2009 | Weldon | 361/23 |
| 7,621,426 | B2 * | 11/2009 | Reynolds et al. | 222/325 |
| 2004/0050875 | A1 | 3/2004 | Kobayashi | |
| 2004/0050876 | A1 | 3/2004 | Muderlak et al. | |
| 2004/0226962 | A1 | 11/2004 | Mazursky et al. | |
| 2004/0251271 | A1 | 12/2004 | Jackson et al. | |
| 2005/0087557 | A1 | 4/2005 | Oliver et al. | |
| 2005/0127099 | A1 | 6/2005 | Chou | |
| 2005/0139612 | A1 | 6/2005 | Matthews et al. | |
| 2005/0233915 | A1 | 10/2005 | Smith | |
| 2005/0247735 | A1 | 11/2005 | Muderlak et al. | |
| 2005/0258192 | A1 | 11/2005 | Matthews et al. | |
| 2006/0011655 | A1 | 1/2006 | Ophardt | |
| 2006/0175341 | A1 | 8/2006 | Rodrian | |
| 2006/0243740 | A1 | 11/2006 | Reynolds et al. | |

FOREIGN PATENT DOCUMENTS

| | | | |
|---|---|---|---|
| EP | 0565713 | B1 | 10/1993 |
| EP | 0618147 | B1 | 10/1994 |
| EP | 0392238 | B1 | 1/1995 |
| EP | 0703831 | B1 | 4/1996 |
| EP | 1671568 | A2 | 6/2006 |
| EP | 2008561 | A2 | 12/2008 |
| GB | 2284800 | A | 6/1995 |
| NZ | 518476 | A | 3/2005 |
| WO | 9208657 | A1 | 5/1992 |
| WO | 9526831 | A1 | 10/1995 |
| WO | 9529759 | A1 | 11/1995 |
| WO | 2008/093213 | A1 | 8/2008 |
| WO | 2008/095187 | A1 | 8/2008 |

OTHER PUBLICATIONS

Espacenet Bibliographic data for CN 1796249A; Publication Date: Jul. 5, 2006; 2 pgs.

English Translation of Chinese Office Action for Application No. 200880111541.4; Date of Notification: Apr. 13, 2011; 5 pgs.

English abstract for DE4029462A1; Publication date: Mar. 28, 1991; Inventor: Zoltan Cseri et al.

English abstract for W09208657A1; Publication date: May 29, 1992; Inventor: Shoji Uehira et al.
English abstract for EP0392238B1; Publication date: Jan. 25, 1995; Inventor: Karl-Heinz Fuchs.
English abstract for NZ518476; Publication date: Mar. 24, 2005; Inventor: Kenneth J. Muderlak et al.
EcoCare Personnel Hygiene System; Local Distribution Systems; "Models NTP, NTR-2 and NTR-8 Hand Dispensing Systems"; 2006.
Kimberly-Clark Professional; Dispensers—Soaps—Product Code: 92044; 2005.
Kimberly-Clark Professional; Dispensers—Soaps—SaniTUFF—Product Code: 92013; 2005.
Kimberly-Clark Professional; Dispensers—Soaps—OnePak; 2005.
Kimberly-Clark Professional; Dispensers—Soaps—TWINPAK; 2005.
Kimberly-Clark Professional; Dispnesers—Soaps—Mini500; 2005.
Kimberly-Clark Professional; "Professional Skin Care Products and Systems"; Mar. 2003.

* cited by examiner

PUMPING DISPENSER

CROSS REFERENCE TO RELATED APPLICATIONS

This application claims the benefit of U.S. Provisional Application Ser. No. 60/981,621, filed Oct. 22, 2007, which is incorporated herein by reference in its entirety.

BACKGROUND OF THE INVENTION

Soap dispensers have been developed that dispense soap. A drawback with the soap dispensers is that after the dispensers have been filled with soap, subsequent users of the dispensers may not be able to determine what type of soap is contained within the dispensers. Further, even if the soap dispensers have a collapsible bag for holding the soap, when the soap is partially removed from the collapsible bag, the bag collapses making any information or text on the bag difficult to read.

Accordingly, the inventors herein have recognized a need for a pumping dispenser that minimizes and/or eliminates the above-mentioned deficiencies.

BRIEF DESCRIPTION OF THE INVENTION

An embodiment of the invention includes a device for dispensing a flowable material. The device includes a container holding the flowable material therein and a pumping assembly attached to the container. The pumping assembly includes a pump and a placard portion configured for displaying viewable information thereon associated with the flowable material.

Another embodiment of the invention includes a pumping assembly adapted for use with a device for dispensing flowable material. The pumping assembly includes a pump and a placard portion disposed in physical communication with the pump. The placard portion includes viewable information indicating at least one of the following: a type of flowable material, an efficacy of flowable material for a particular purpose, an attribute of flowable material, and a type of facility that the flowable material can be used.

Another embodiment of the invention includes a dispenser apparatus for dispensing a flowable material. The apparatus includes a pumping assembly having a pump, a pump cover, and a collar portion. The collar portion is removably attached to the pump cover, at least a portion of the pump is disposed within the pump cover, and the pump is captivated between the pump cover and the collar portion.

Another embodiment of the invention includes a dispenser apparatus for dispensing a flowable material. The apparatus includes a chassis portion and a pump. The chassis portion includes an actuator plate movably captivated by the chassis portion so as to be movable in a first direction and a second direction, and having first and second actuator finger portions. The pump includes a nozzle having an engagement feature disposed between the first and second actuator finger portions such that movement of the actuator plate in the first direction causes the nozzle via the engagement feature to move in the first direction, and such that movement of the actuator plate in the second direction causes the nozzle via the engagement feature to move in the second direction.

Another embodiment of the invention includes a dispenser apparatus for dispensing a flowable material. The apparatus includes a housing cover, a sensor disposed proximate the housing cover for sensing a presence of an object, a pump assembly, a motor in operable communication with the pump assembly, a maintenance switch, and a controller in operable communication with the sensor and the motor. The maintenance switch is conspicuously visible at the housing cover and is operably connected to the motor to disable the motor prior to opening the housing cover.

Another embodiment of the invention includes a dispenser apparatus for dispensing a flowable material. The apparatus includes a pumping assembly having a pump, a pump cover, and a collar portion removably attached to the pump cover. The pump is captivated between the pump cover and the collar portion, and at least a portion of the pump is disposed within the pump cover.

Another embodiment of the invention includes a pumping dispenser. The pumping dispenser includes a chassis portion and a pumping assembly configured to be removably received in the chassis portion. The pumping assembly has a pump, a pump cover, a collar portion, and a container holding liquid therein. The pump is configured to receive the liquid from the container and to pump liquid or foam therefrom. The pump cover is configured to receive at least a portion of the pump therein. The pump cover has a placard portion with viewable information thereon associated with liquid in the container. The collar portion is configured to receive a portion of the pump thereon such that the pump is disposed between the pump cover and the collar portion. The collar portion is coupled to the pump cover. The collar portion is further configured to engage the chassis portion. The pumping dispenser further includes a housing cover rotatably coupled to the chassis portion. The housing cover has a transparent or translucent region for allowing viewing of the placard portion.

Another embodiment of the invention includes a pumping assembly for installation in a chassis portion of a dispenser. The pumping assembly includes a pump and a container holding liquid therein. The container fluidly communicates with the pump. The pumping assembly further includes a pump cover configured to receive at least a portion of the pump therein. The pump cover has a placard portion with viewable information thereon associated with the liquid in the container. The pumping assembly further includes a collar portion configured to receive a portion of the pump thereon such that the pump is disposed between the pump cover and the collar portion. The collar portion is coupled to the pump cover, wherein the pump is configured to receive the liquid from the container and to pump liquid or foam therefrom.

Another embodiment of the invention includes a pumping dispenser. The pumping dispenser includes a chassis portion and a pumping assembly configured to be removably received in the chassis portion. The pumping assembly has a pump and a container holding liquid therein. The pump is configured to receive the liquid from the container and to pump liquid or foam therefrom. The pump has a placard portion with viewable information thereon associated with liquid in the container. The pumping dispenser further includes a housing cover rotatably coupled to the chassis portion. The housing cover has a window for allowing viewing of the placard portion.

Another embodiment of the invention includes a pumping assembly for installation in a chassis portion of a dispenser. The pumping assembly includes a pump and a container holding liquid therein. The container fluidly communicates with the pump. The pumping assembly further includes a pump cover configured to receive at least a portion of the pump therein. The pump has a placard portion with viewable information thereon associated with liquid in the container, wherein the pump is configured to receive the liquid from the container and to pump liquid or foam therefrom.

DETAILED DESCRIPTION OF THE INVENTION

Figure 1:
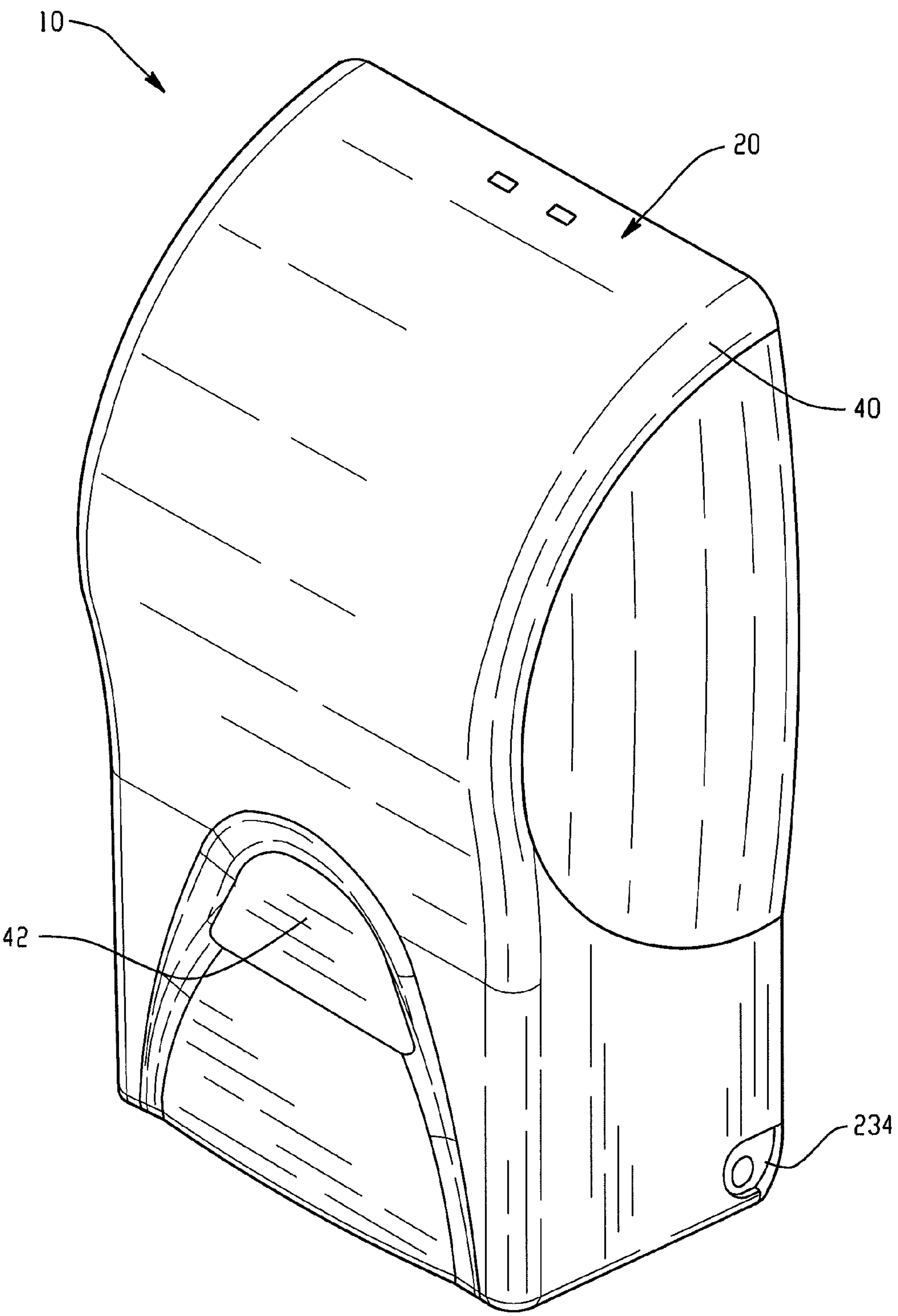
FIG. 1 is a front isometric view schematic of a pumping dispenser in accordance with an exemplary embodiment.

Referring to FIGS. 1-6, an example pumping dispenser 10 for automatically dispensing a liquid or a foam, more generally referred to as a flowable material, is illustrated. In an embodiment, the pumping dispenser 10 includes a housing cover 20, a back housing 22, a pumping assembly 24, a chassis portion 26, and a control circuit 28. An advantage of the pumping dispenser 10 is that the pumping dispenser 10 utilizes an internal placard portion having information thereon associated with the liquid contained within the pumping dispenser 10. For example, and without limitation, the internal placard portion can have textual information or have a predetermined color indicating at least one of: (i) a type of liquid, (ii) an efficacy of the liquid for a particular purpose, (iii) an attribute of the liquid, and (iv) a type of facility that the liquid can be used within.

Referring to FIG. 1, the housing cover 20 is provided to enclose internal components of the pumping dispenser 10. In an embodiment the housing cover 20 is rotatably coupled to the chassis portion 26 and can rotate between first and second rotational positions. Other coupling arrangements between the housing cover 20 and chassis portion 26 may also be employed, such as a translational coupling for example, where the housing cover 20 slides onto chassis portion 26 for engagement therewith. In one exemplary embodiment, the housing cover 20 is constructed from plastic. Further, the housing cover 20 has a translucent portion or region 40 and a transparent portion or region 42. The transparent region 42 allows a user to view the placard portion 88 disposed inside of the pumping dispenser 10. In an alternative embodiment, the entire housing cover 20 can be either translucent or transparent to allow a user to view the placard portion 88 disposed inside of the pumping dispenser 10.

Figure 2:
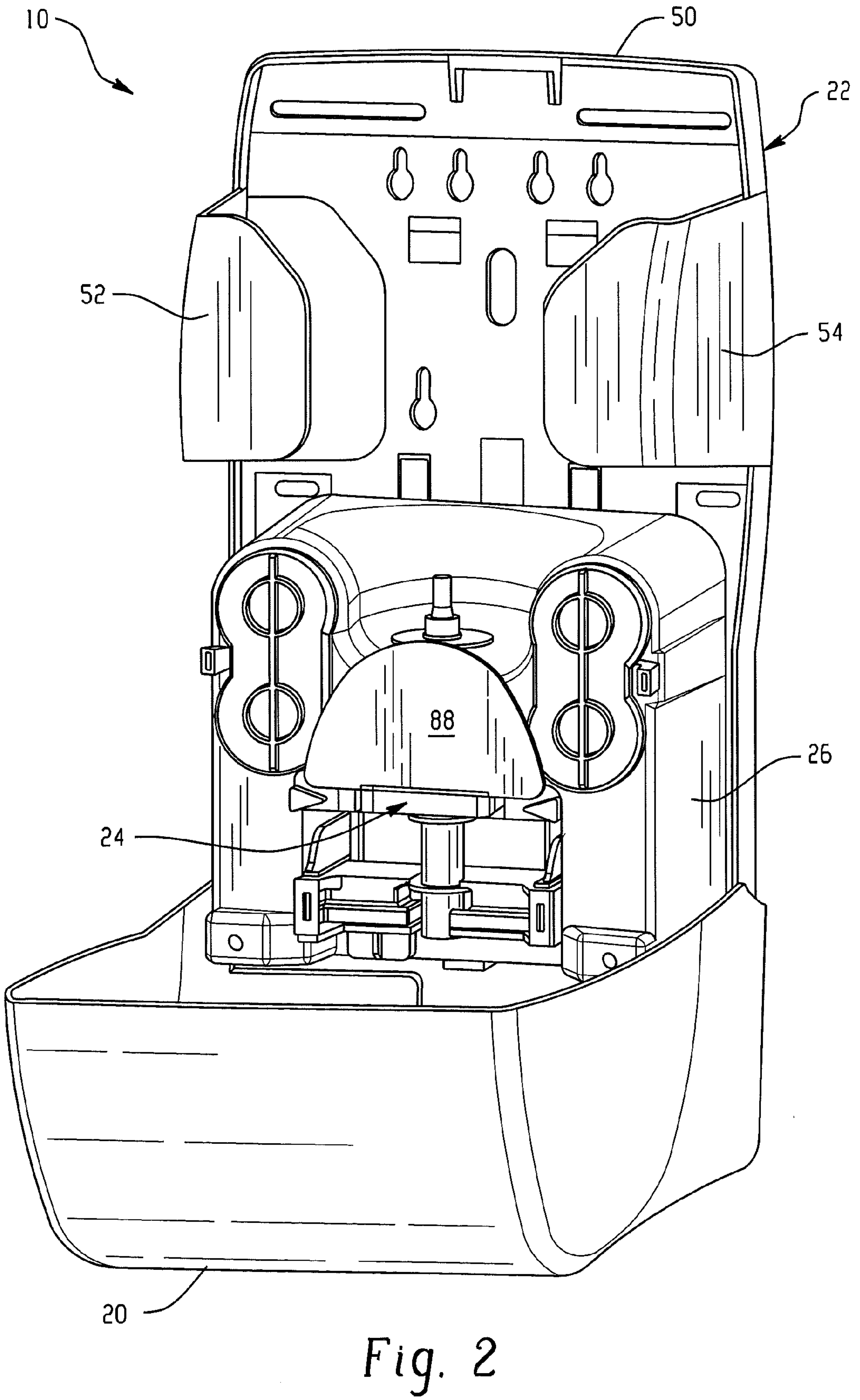
FIG. 2 is another front isometric view schematic of the pumping dispenser of FIG. 1 with a cover open.
Figure 3:
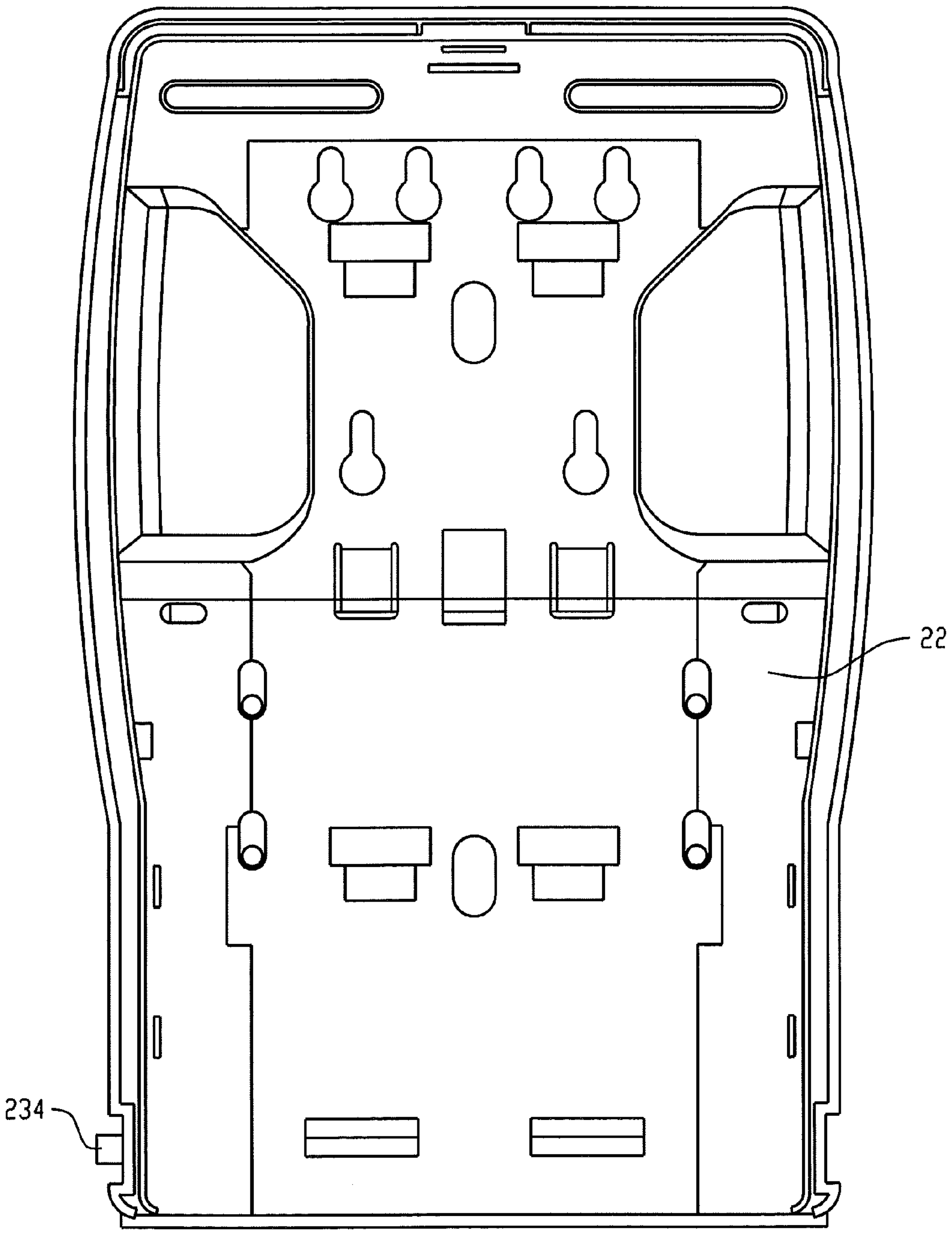
FIG. 3 is a back view schematic of a back housing of the pumping dispenser of FIG. 1.
Figure 4:
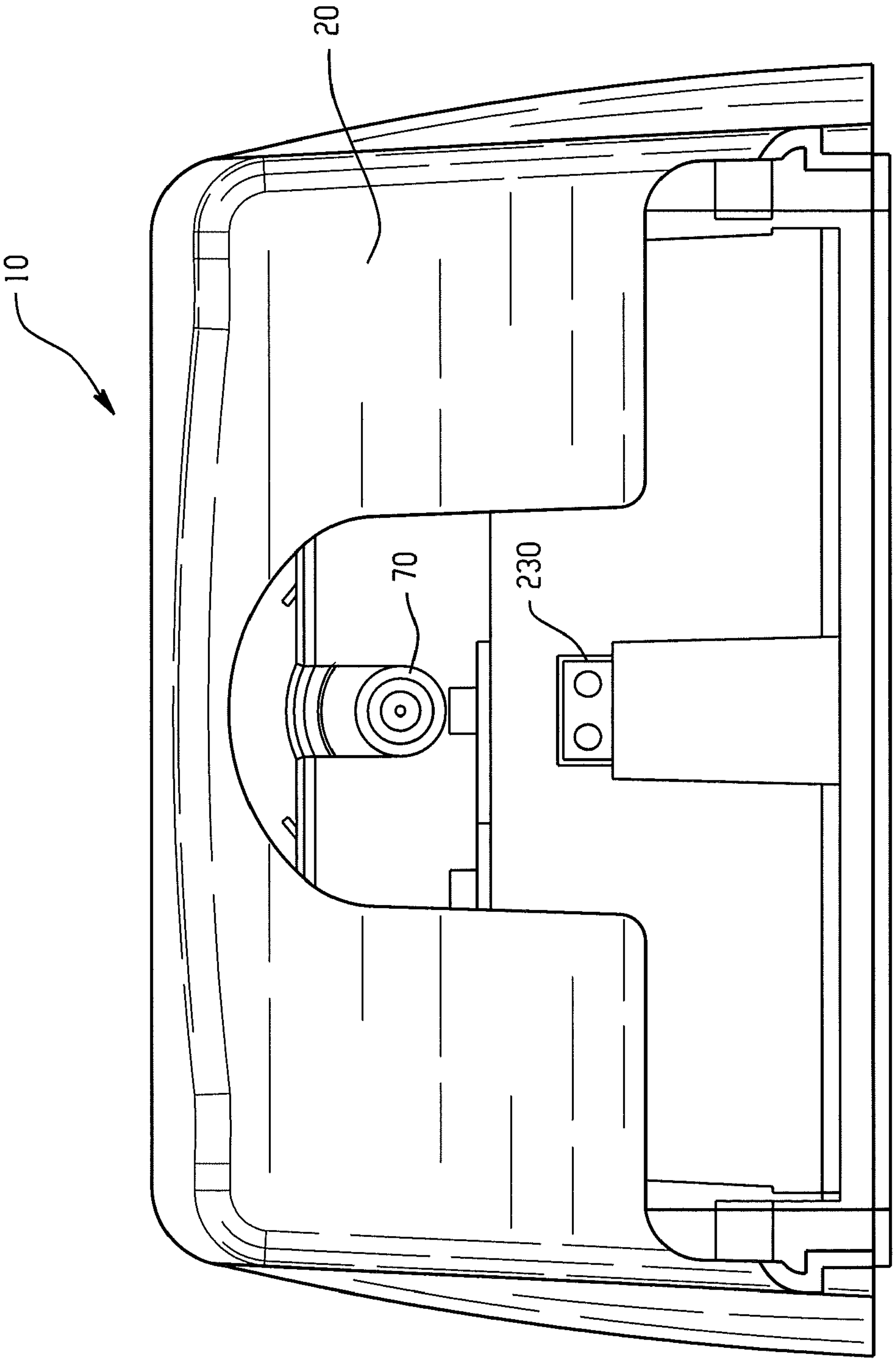
FIG. 4 is a bottom view schematic of a bottom portion of the pumping dispenser of FIG. 1.

Referring to FIG. 2, the back housing 22 is provided to support the chassis portion 26 thereon. The back housing 22 includes a plate 50 and finger portions 52, 54 extending outwardly from the plate 50. The chassis portion 26 is fixedly coupled to the plate 50. The finger portions 52, 54 are utilized to hold a container 72 (best seen by reference to FIG. 6) of the pumping assembly 24. In one exemplary embodiment, the back housing 22 is constructed from plastic.

Figure 6:
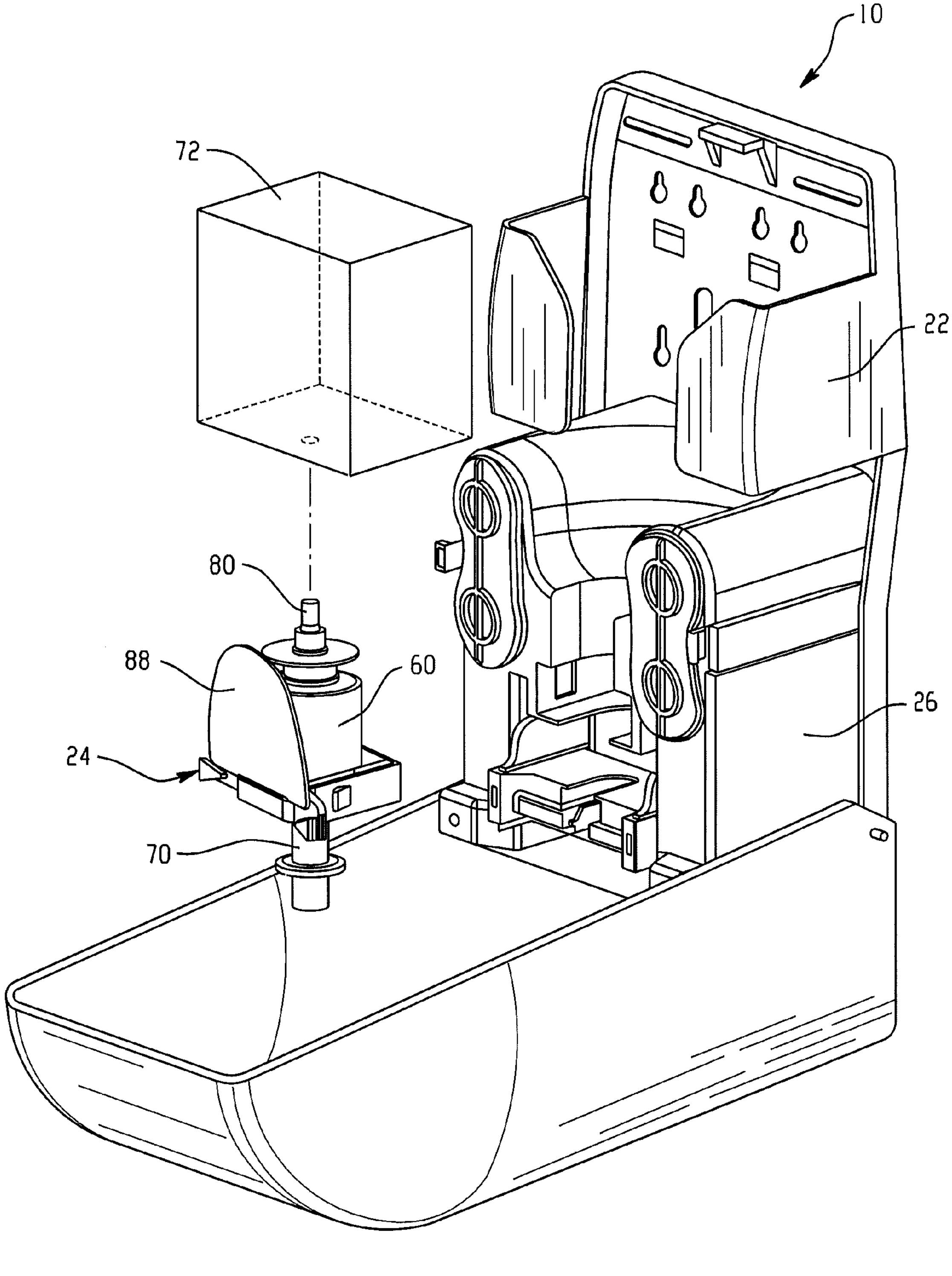
FIG. 6 is a side isometric view schematic of the pumping dispenser of FIG. 2.
Figure 7:
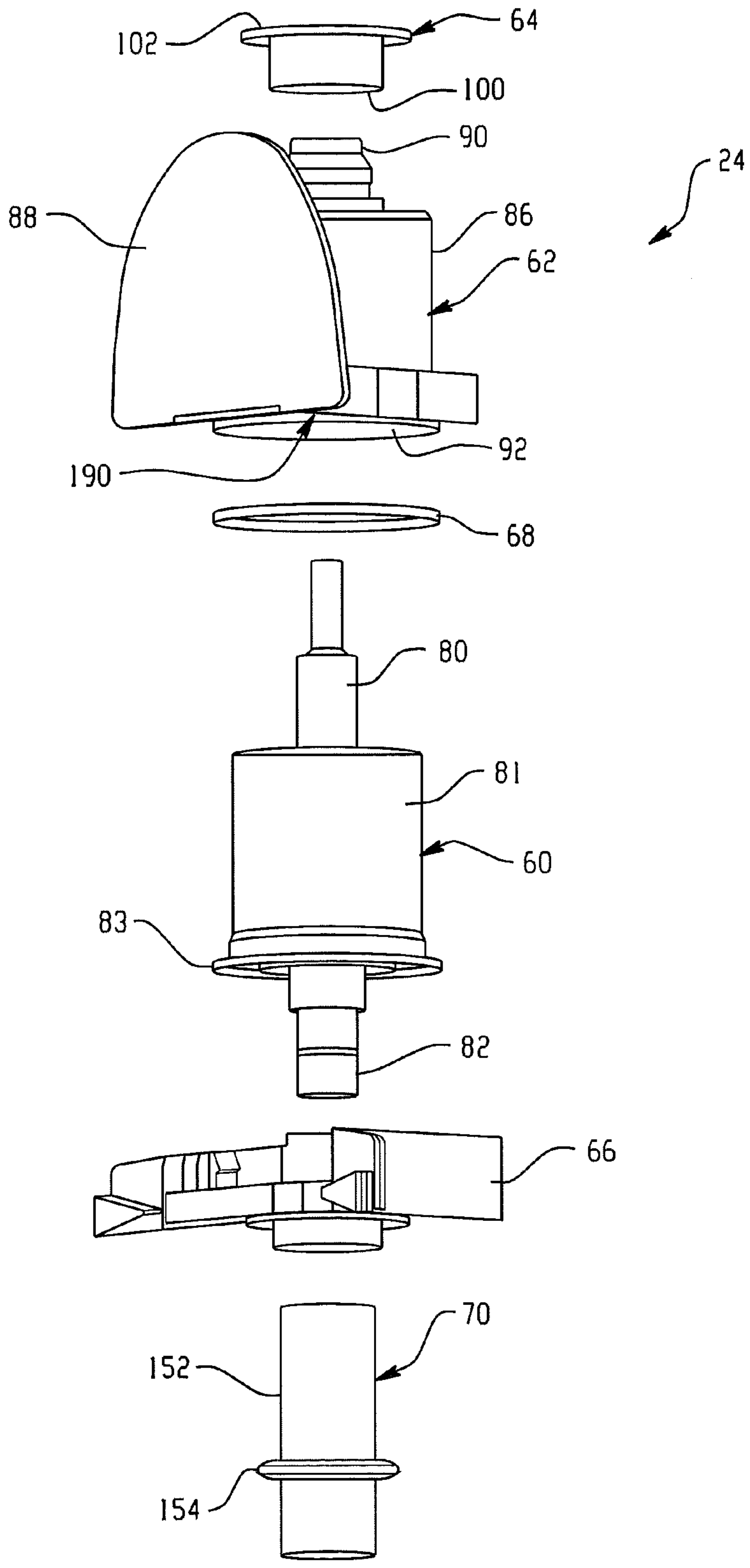
FIG. 7 is an exploded assembly view schematic of a pumping assembly utilizable in the pumping dispenser of FIG. 1.

Referring to FIGS. 6 and 7, an embodiment of the pumping assembly 24 is provided to output either a liquid or a foam therefrom. The pumping assembly 24 includes a pump 60, a pump cover 62, a container fitment 64, a collar portion 66, a gasket 68, an extension nozzle 70, and a container 72.

Figure 8:
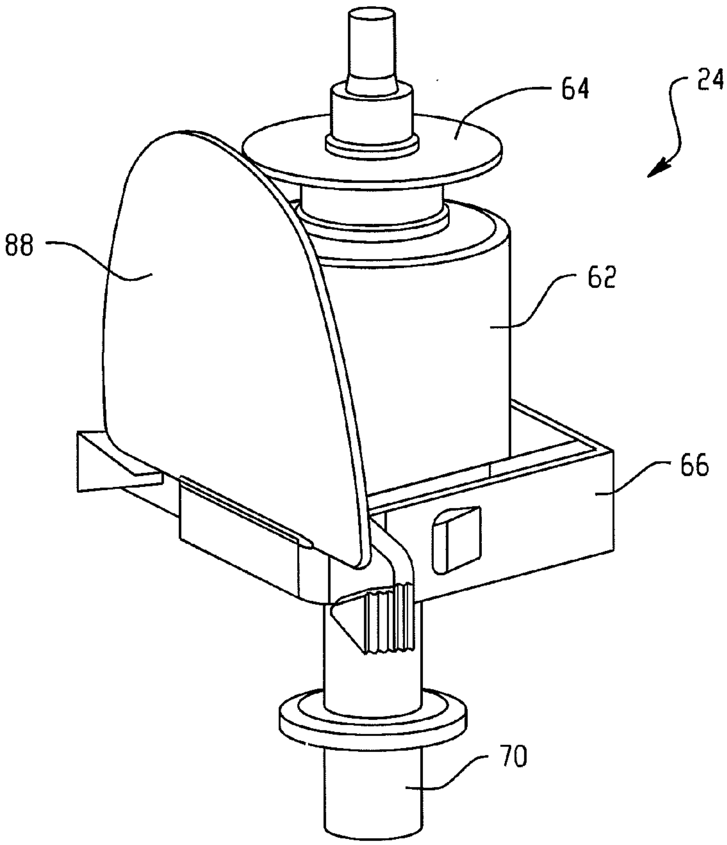
FIG. 8 is a front isometric view schematic of a pumping assembly utilizable in the pumping dispenser of FIG. 1.
Figure 9:
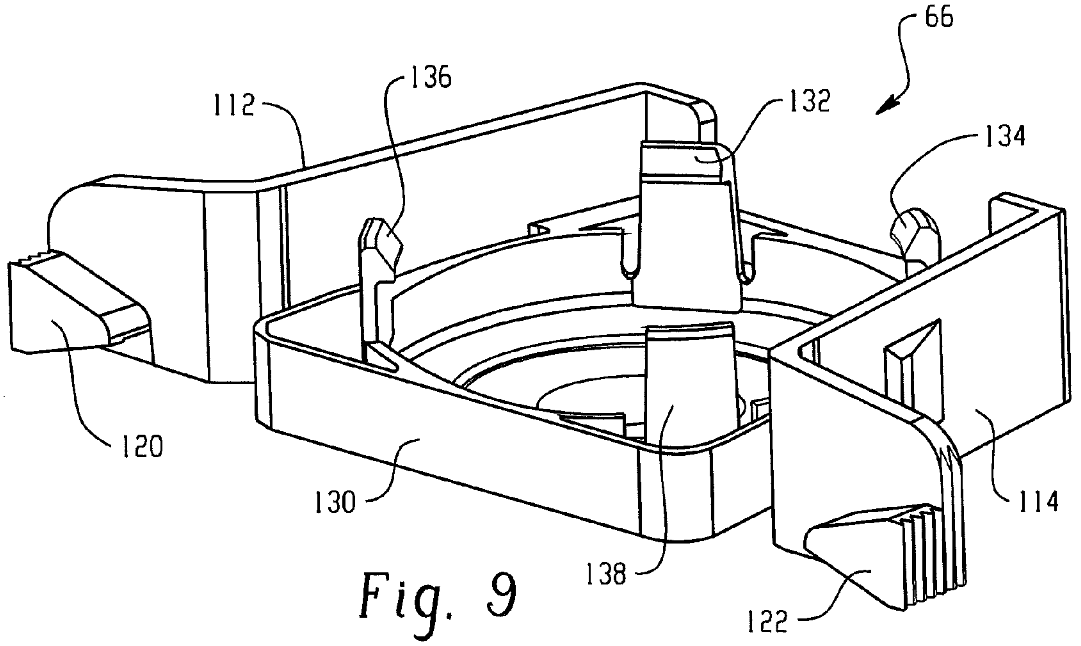
FIG. 9 is a front isometric view schematic of a collar portion utilizable in the pumping assembly of FIG. 8.
Figure 10:
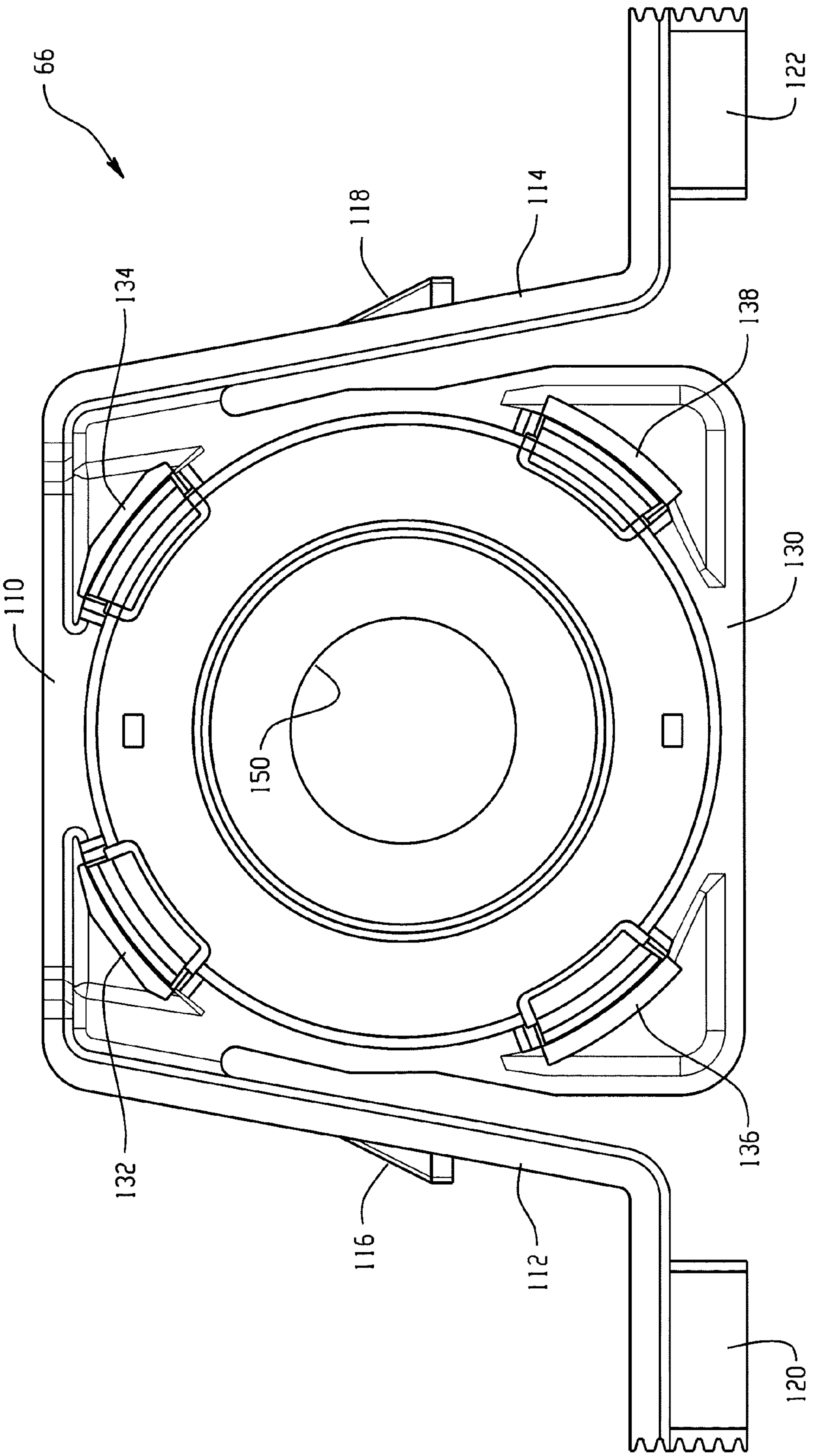
FIG. 10 is a top view schematic of a collar portion utilizable in the pumping assembly of FIG. 8.
Figure 11:
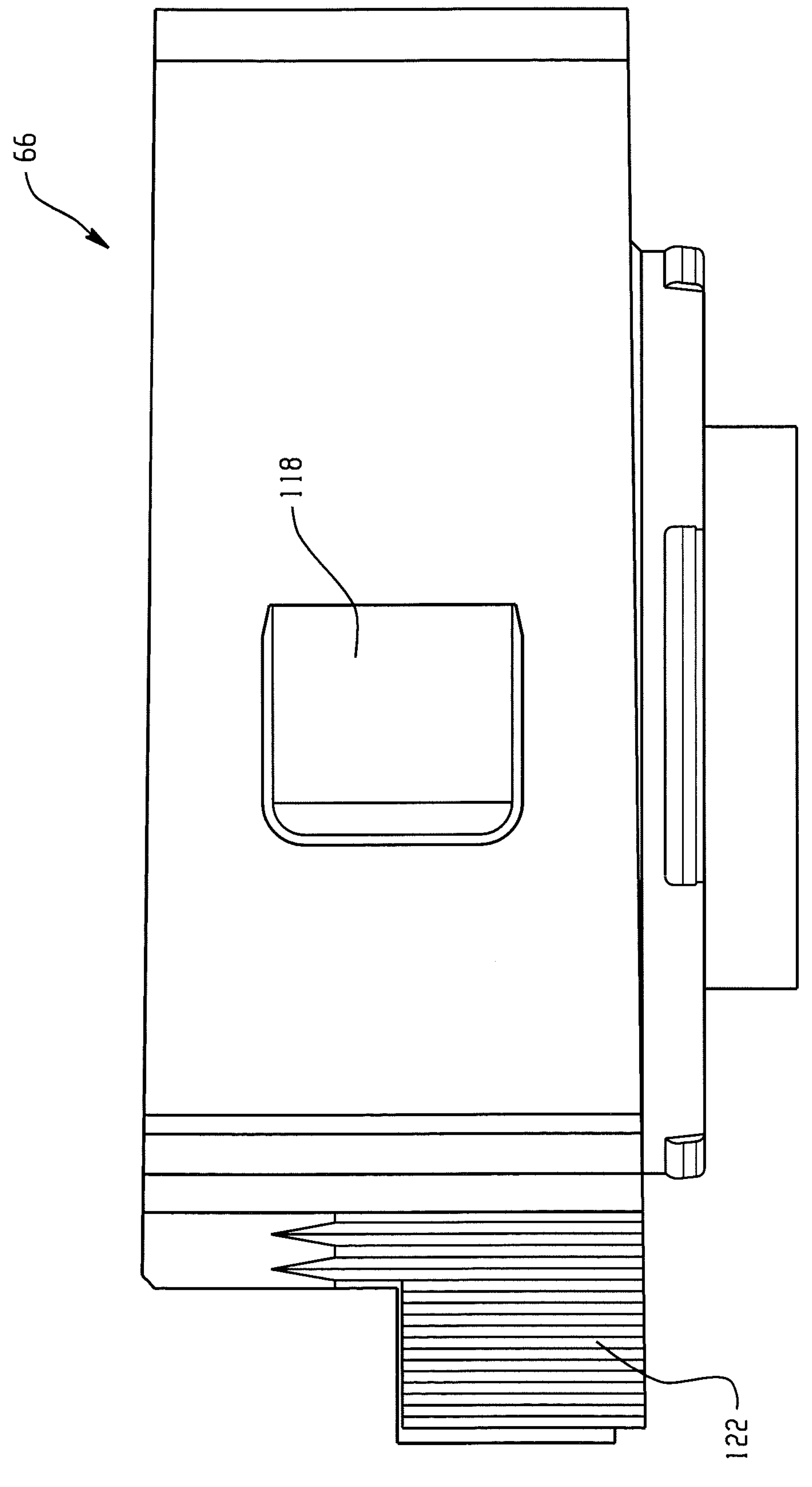
FIG. 11 is a side view schematic of a collar portion utilizable in the pumping assembly of FIG. 8.
Figure 12:
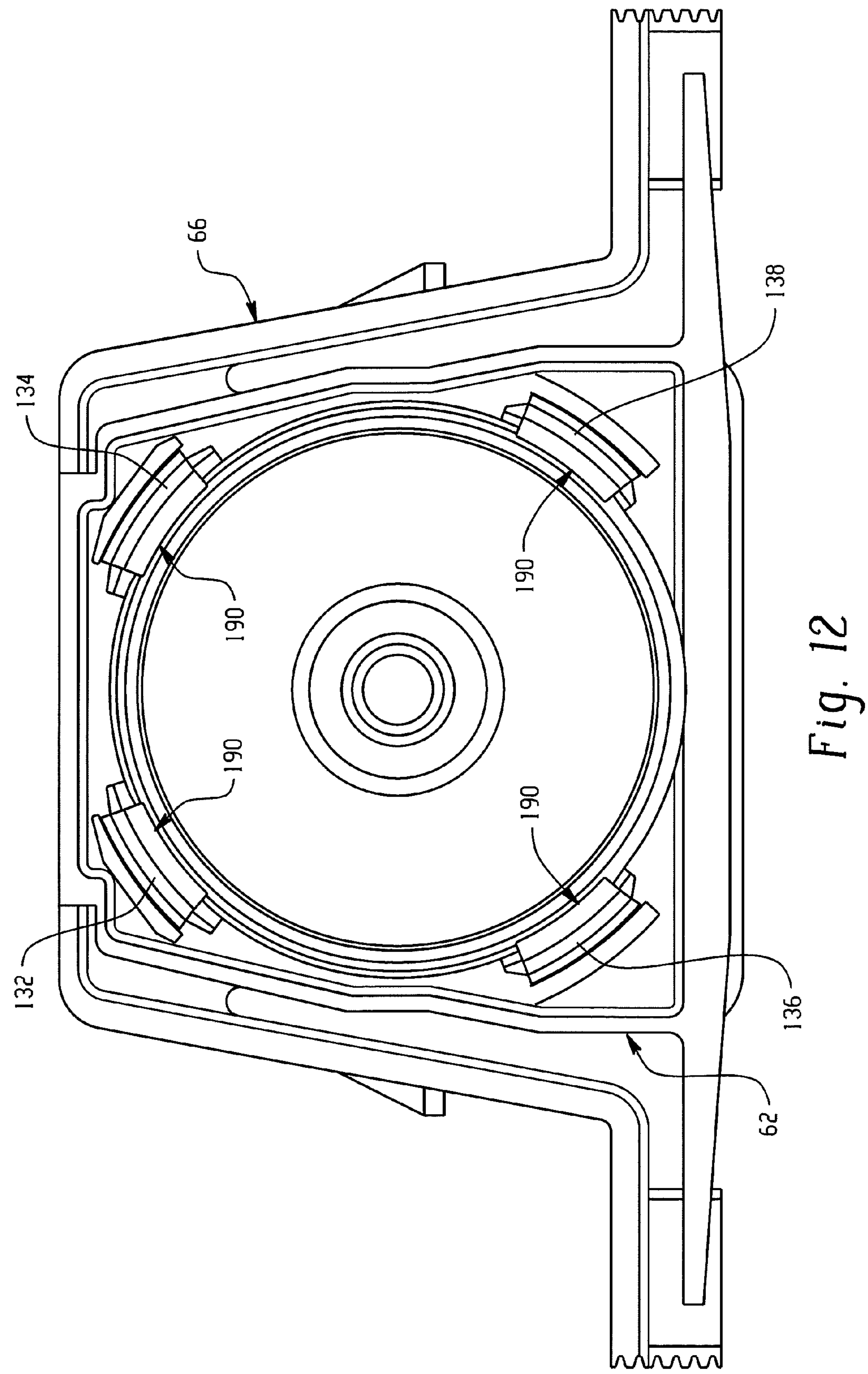
FIG. 12 is a section view schematic of a collar portion and a pump cover utilizable in the pumping assembly of FIG. 8.

Referring to FIGS. 6-8, the pump 60 is provided to pump liquid from the container 72. The pump 60 includes a body portion 81 with an inlet nozzle 80 and an outlet nozzle 82 disposed on opposite sides of the body portion 81. During operation, when the outlet nozzle 82 is displaced in a first direction inwardly into the body portion 81 by the extension nozzle 70, the pump 60 pumps liquid or foam from the body portion 81 through the outlet nozzle 82. When the outlet nozzle 82 is displaced in a second direction by the extension nozzle 70, opposite the first direction, outwardly from the body portion 81, the pump 60 pumps liquid from the container 72 into the body portion 81. If the pump 60 is configured to output foam, the pump 60 also pumps air into the body portion 81, when the outlet nozzle 82 is displaced in the second direction.

Referring to FIGS. 7 and 8, the pump cover 62 is provided to enclose a portion of the pump 60. In one exemplary embodiment, the pump cover 62 is constructed from plastic. The pump cover 62 includes a cover portion 86, a placard portion 88, and an inlet portion 90. An aperture 92 extends through the cover portion 86 and the inlet portion 90. A portion of the pump 60 is configured to be disposed in the aperture 92 such that the inlet nozzle 80 extends through the cover portion 86 and the inlet portion 90 of the pump cover 62 and engages the container fitment 64. The placard portion 88 is fixedly attached to the cover portion 86. In one exemplary embodiment, the placard portion 88 is configured for displaying viewable information thereon that includes textual information disposed thereon or colors disposed thereon that is associated with the liquid in the container 72. In particular, but without limitation, the internal placard portion 88 can have textual information or have a predetermined color indicating at least one of: (i) a type of the liquid, in container 72

(ii) an efficacy of the liquid for a particular purpose, (iii) an attribute of the liquid, and (iv) a type of facility that the liquid can used within.

For example, but without limitation, the placard portion 88 can have textual information that the container 72 has at least one of: (i) a liquid soap, (ii) a liquid lotion, (iii) a sanitizer soap, and (iv) an antimicrobial liquid therein. Further, for example, the placard portion 88 can have one of a plurality of colors indicating that the container 72 has at least one of: (i) a liquid soap, (ii) a liquid lotion, (iii) a sanitizer soap, and (iv) an antimicrobial liquid therein.

Further, for example, but without limitation, the placard portion 88 can have textual information that the liquid has an efficacy for at least one of: (i) light to medium duty cleaning, (ii) killing at least one of bacteria, yeast, and mold, and (iv) heavy duty cleaning. Further, for example, the placard portion 88 can have one of a plurality of colors indicating that the liquid has an efficacy for at least one of: (i) light to medium duty cleaning, (ii) killing at least one of bacteria, yeast, and mold, and (iv) heavy duty cleaning.

Further, for example, but without limitation, the placard portion 88 can have textual information indicating that the liquid can be used in at least one of the following types of facilities: (i) a healthcare facility, (ii) a food processing facility, (iii) a food service facility, (iv) an office facility, (v) a manufacturing facility, (vi) a hotel facility, (vii) an airport facility, (viii) a stadium facility, (ix) a church facility, (x) a school facility, and (xi) a child care facility. Further, for example, the placard portion 88 can have one of a plurality of colors indicating that that the liquid can be used in at least one of the following types of facilities: (i) a healthcare facility, (ii) a food processing facility, (iii) a food service facility, (iv) an office facility, (v) a manufacturing facility, (vi) a hotel facility, (vii) an airport facility, (viii) a stadium facility, (ix) a church facility, (x) a school facility, and (xi) a child care facility.

Referring to FIGS. 6 and 7, the container fitment 64 is provided to couple the container 72 to the pump 60. In one exemplary embodiment, the container fitment 64 is constructed from plastic. The container fitment 64 includes a tubular portion 100 and a rim portion 102 disposed on one end of the tubular portion 100. The tubular portion 100 is fixedly but removably attached to an outer surface of the inlet portion 90 of the pump cover 62 with a sealing fitment sufficient to deter or prevent leakage of liquid from container 72. The rim portion 102 is fixedly attached to the container 72 such that an aperture in the container 72 communicates with an aperture extending through the tubular portion 100. In one exemplary embodiment, an underside of the rim portion 102 is heat staked to an inside portion of the container 72, which encloses the rim portion 102. In alternative embodiments, other means of attaching the container fitment 64 to the container 72 are utilized. For example, the container fitment 64 could be glued or ultrasonically welded to the container 72.

Referring to FIGS. 9-13, the collar portion 66 is provided to support the pump 60 thereon. In particular, the collar portion 66 is provided to support the pump 60 thereon such that the pump 60 is disposed and captivated between the pump cover 62 and the collar portion 66. Further, the collar portion 66 is fixedly but removably attached to the pump cover 62. The collar portion 66 is further configured to be removable coupled to the chassis portion 26 as will be described in further detail below. The collar portion 66 includes a back wall 110, flexible arms 112, 114, a base portion 130, and engagement tabs 132, 134, 136, 138. The flexible arms 112, 114 extend from the back wall 110 opposite one another and in spring-bias opposition to one another. The flexible arms 112, 114 have engagement tabs 116, 118, respectively, extending therefrom. The engagement tabs 116, 118 are configured to be received in first and second slots 188 (locations depicted in FIGS. 13 and 19) in the chassis portion 26 in a snap-fit engagement arrangement, for removably holding the pumping assembly 24 in the chassis portion 26. The flexible arms 112, 114 further have finger tabs 120, 122, respectively, thereon. When the finger tabs 120, 122 are displaced toward one another, the flexible arms 112, 114 are displaced toward one another for allowing the engagement tabs 116, 118 to either be received in slots 188 (locations depicted in FIGS. 13 and 19) on the chassis 26 or removed from the slots 188 on the chassis 26. The base portion 130 is attached to the back wall 110 and is disposed between the flexible arms 112, 114. The base portion 130 has an aperture 150 extending therethrough for allowing the extension nozzle 70 to be disposed therethrough. The engagement tabs 132, 134, 136, 138 extend outwardly from the base portion 130 and are configured to engage slots 190 (locations depicted in FIGS. 7 and 12) in the pump cover 62 for removably coupling the pump cover 62 to the collar portion 66 in a snap-fit engagement arrangement.

Referring to FIG. 7, the gasket 68 is disposed between the pump 60 and the pump cover 62, where the gasket 68 sits on top of a lip 83 arranged at the bottom of body portion 81. The gasket 68 is constructed from a pliable material and is utilized to form a seal between the pump 60 and the pump cover 62.

The extension nozzle 70 is provided to be coupled to the outlet nozzle 82 of the pump 60. The extension nozzle 70 includes a tubular portion 152 and a ring portion 154 disposed around the tubular portion 152. The tubular portion 152 is configured to extend through the aperture 150 (best seen by reference to FIG. 10) of the collar portion 66 and to be received over the outlet nozzle 82 of the pump 60. During operation of the pumping assembly 24, liquid or foam exiting the outlet nozzle 82 is routed through the extension nozzle 70.

Referring to FIG. 6, the container 72 is provided to hold a liquid therein. Various liquids can be held within the container 72. For example, the liquid can comprise at least one of a liquid soap, a liquid lotion, a sanitizer liquid and an antimicrobial liquid. In one exemplary embodiment, the container 72 comprises a collapsible plastic container. In another exemplary embodiment, the container 72 comprises a rigid or semi-rigid plastic container. The container 72 has an aperture for receiving the inlet nozzle 80 of the pump 60 therein.

Referring to FIG. 13-16, the chassis portion 26 is provided for supporting the pumping assembly 24 therein. The chassis portion 26 includes a housing 170, a drive assembly 172 (best seen by reference to FIGS. 17-19), an actuator plate 174, a spacer portion 176, and battery covers 178, 180.

Figure 13:
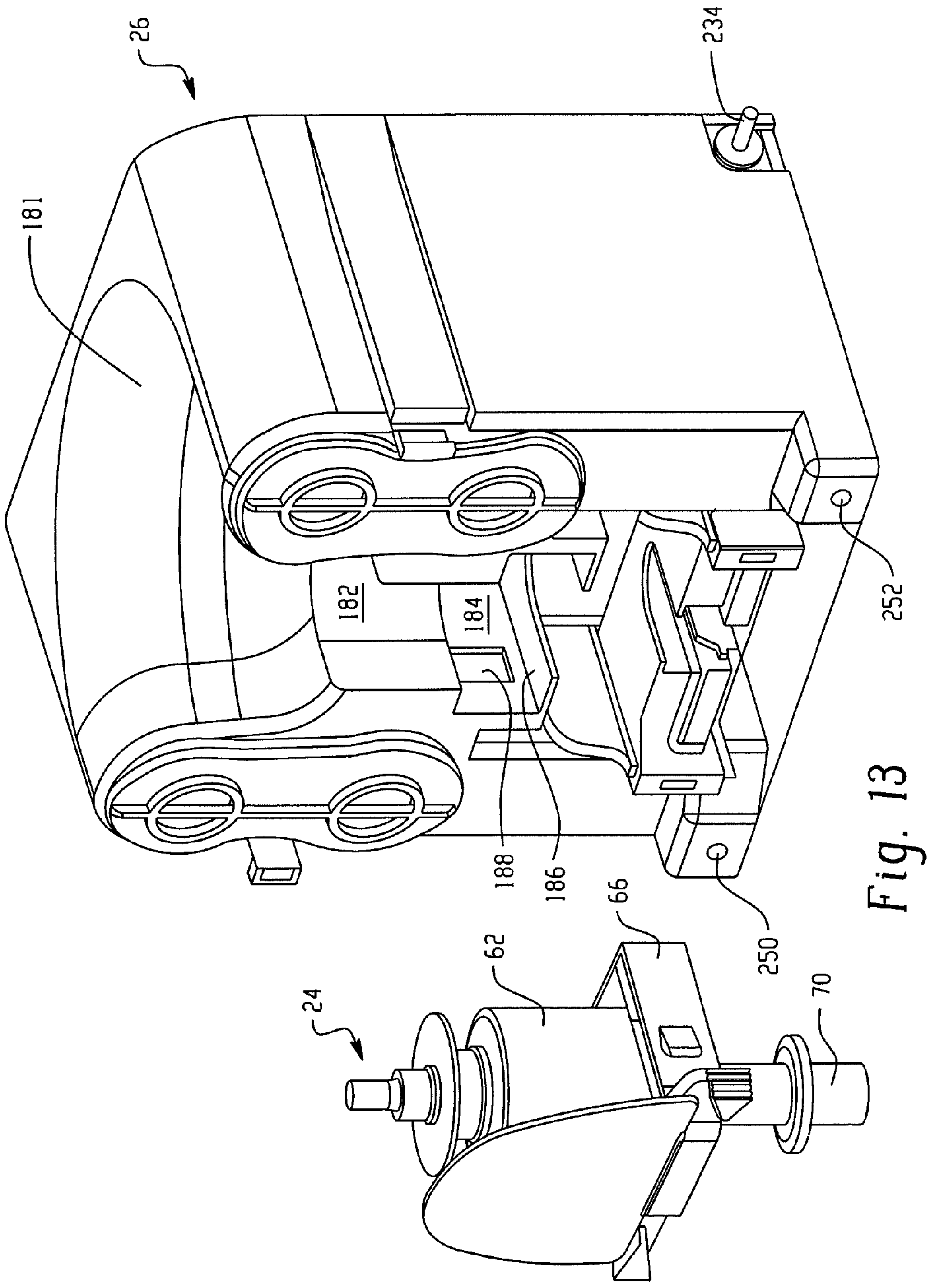
FIG. 13 is an exploded assembly view schematic of a pumping assembly and a chassis portion utilizable in the pumping dispenser of FIG. 1.
Figure 15:
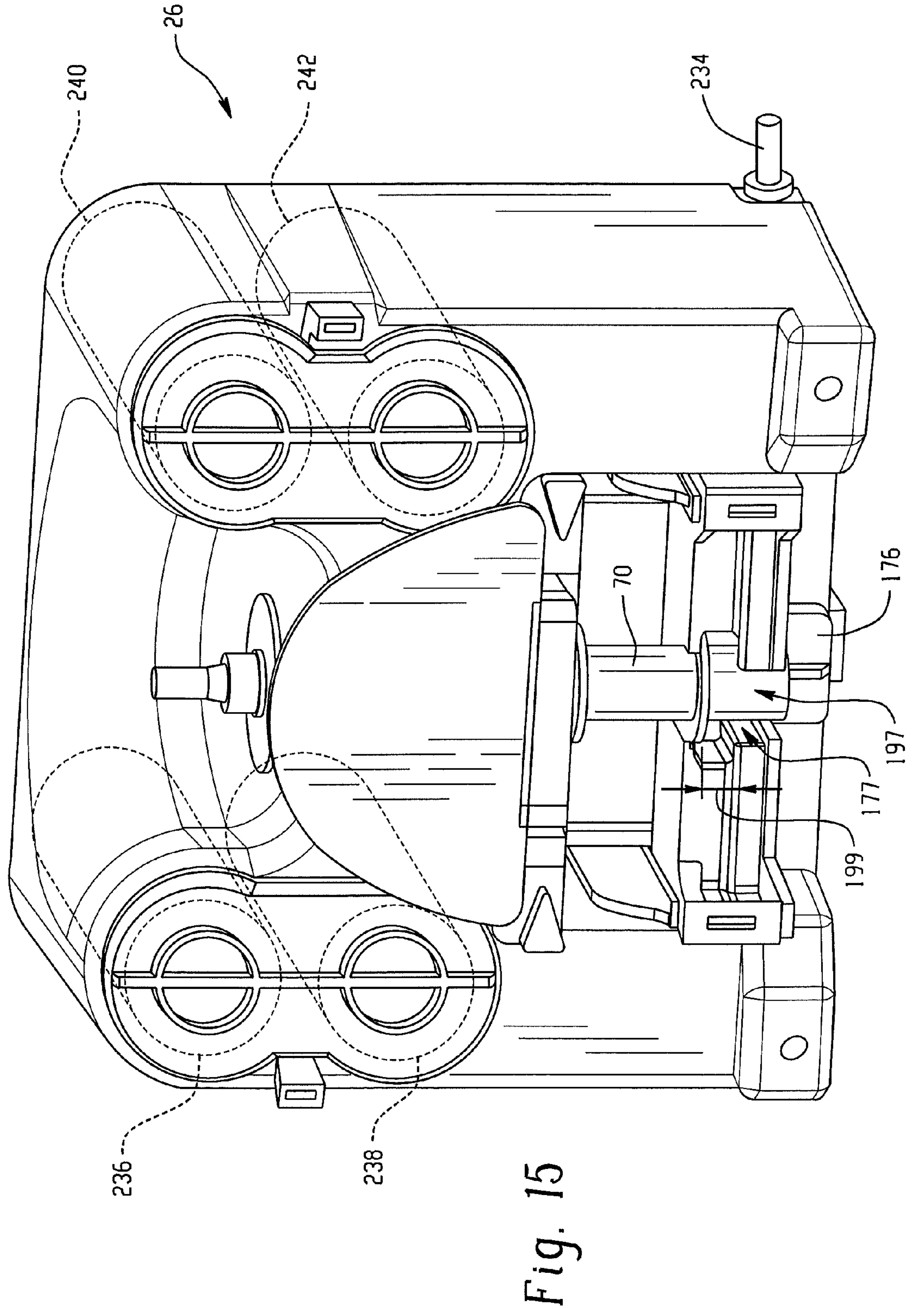
FIG. 15 is another front isometric view schematic of the pumping assembly and a chassis portion utilizable in the pumping dispenser of FIG. 1 with a slidable spacer portion in a second position.

With reference now to FIGS. 13 and 15 the housing 170 includes a bowl shaped wall 181 configured to receive a portion of the container 72. The housing 170 further includes an arcuate-shaped wall 182 communicating with the bowl shaped wall 181 that defines a region for receiving the pump cover 62 therein. The housing 170 further includes another arcuate-shaped wall 184 communicating with the arcuate-shaped wall 182 that defines a region for receiving the collar portion 66 therein. The arcuate-shaped wall 184 includes a slot 188 and a second slot (not shown) for removably receiving engagement tabs 116, 118, respectively, of the collar portion 66 therein. The housing 170 further includes an annular ledge 186 extending from the arcuate-shaped wall 184 for supporting the collar portion 66 thereon. The housing 170 is further configured to hold the batteries 236, 238, 240, 242 therein.

Figure 17:
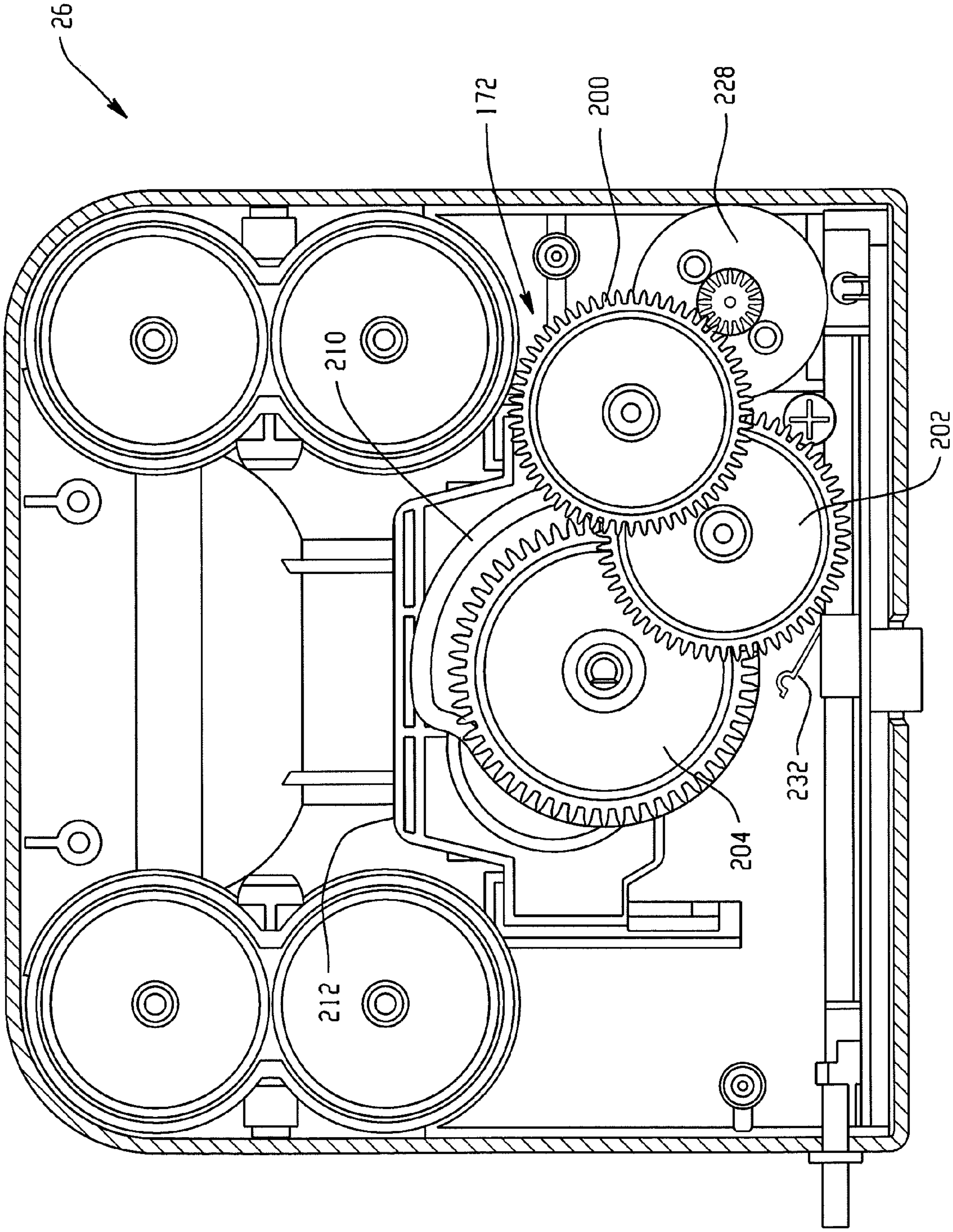
FIG. 17 is a front view schematic of a bottom portion of a chassis portion utilizable in the pumping dispenser of FIG. 1 showing internal motor and drive features in a first operational position.
Figure 18:
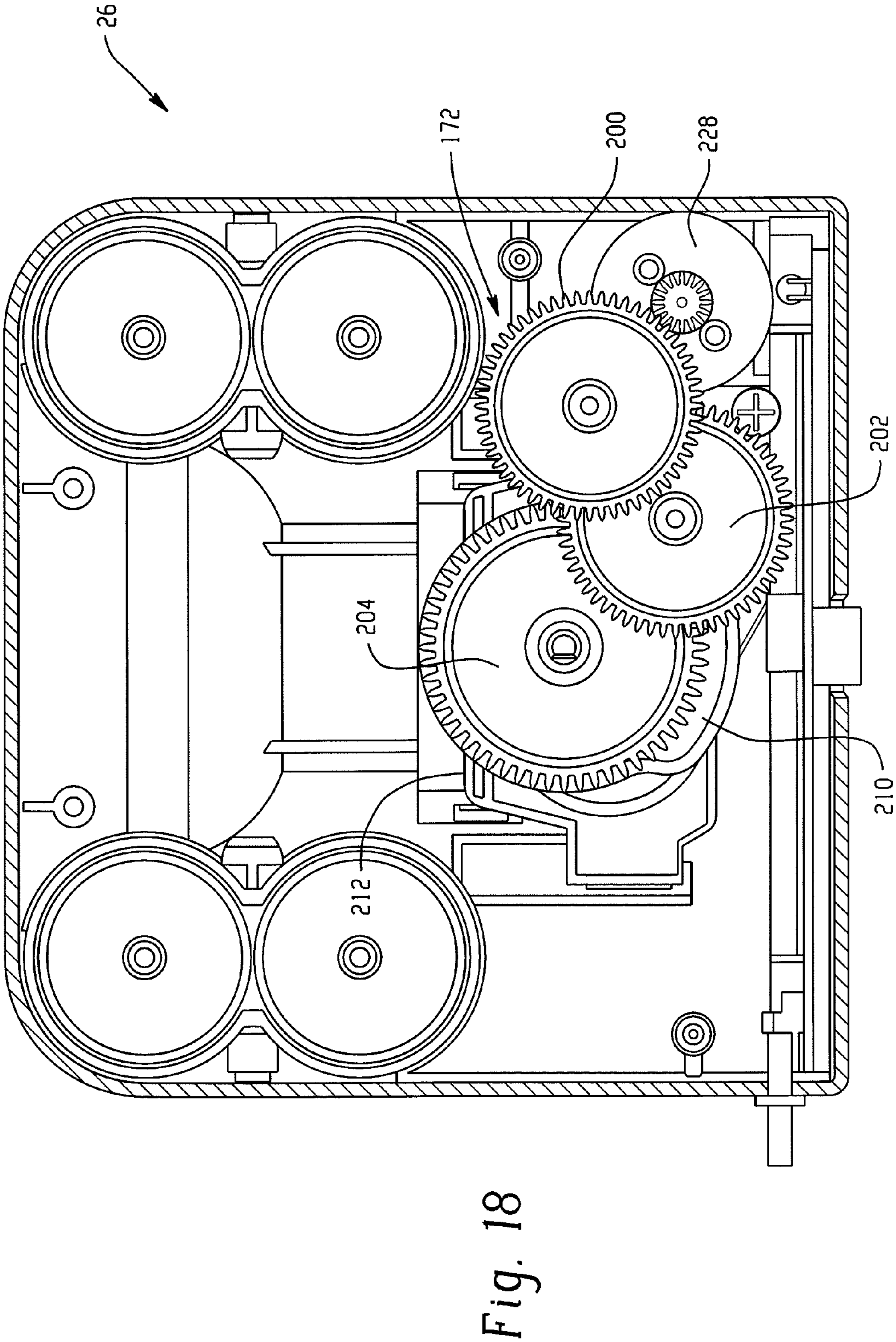
FIG. 18 is another front view schematic of a bottom portion of a chassis portion utilizable in the pumping dispenser of FIG. 1 showing internal motor and drive features in a second operational position.
Figure 19:
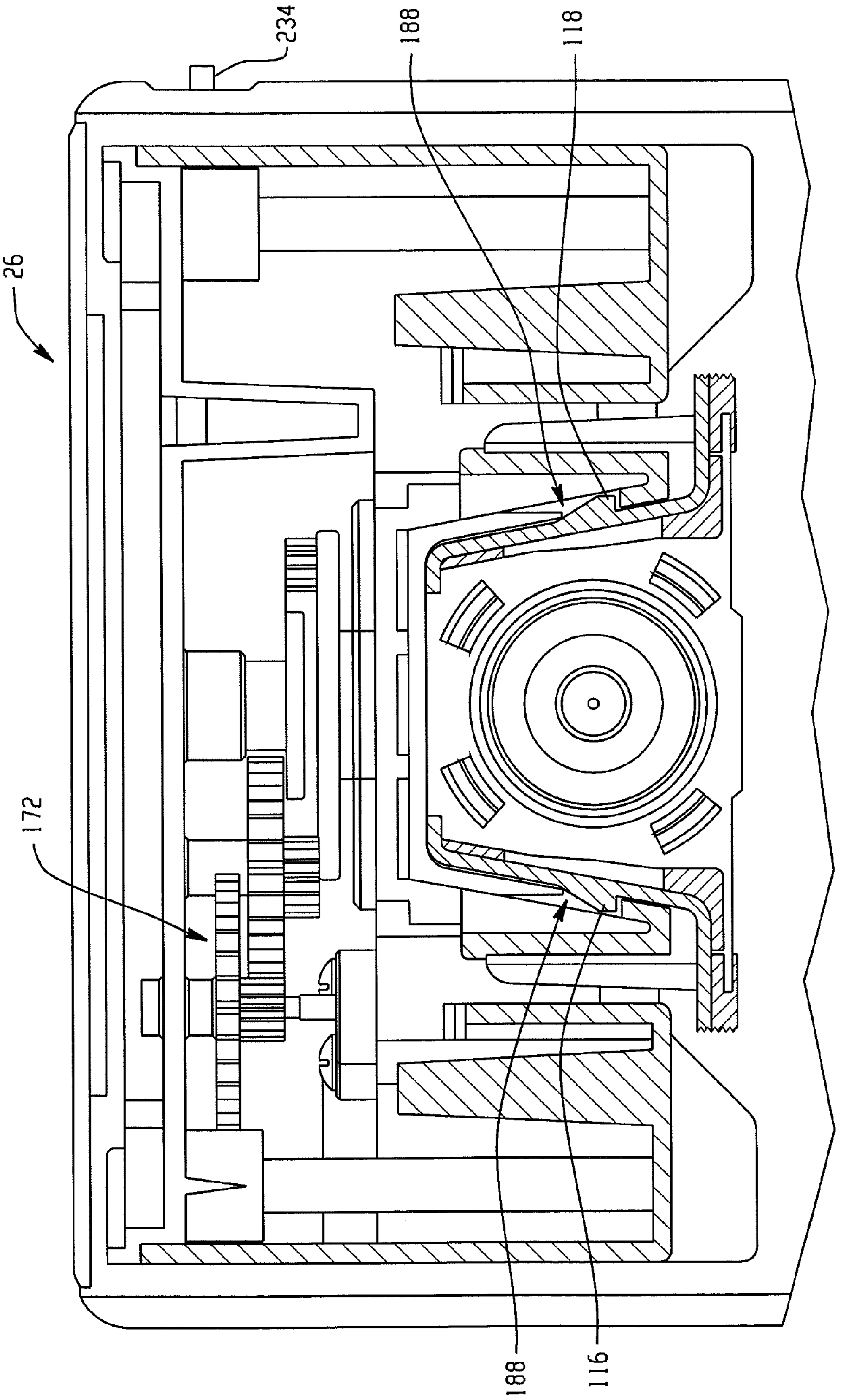
FIG. 19 is a bottom view schematic of the portion of the chassis portion of FIG. 17 with a portion of the chassis portion cover removed to show internal motor and drive features.

Referring to FIGS. 17-19, the drive assembly 172 includes gears 200, 202, 204, a cam 210, and a slider portion 212, and is provided to move the actuator plate 174, via engagement with slider portion 212, in first and second directions which moves the extension nozzle 70 in first and second directions, respectively, to actuate the pump 60. The motor 228 rotates the gear 200, which rotates another gear 202. Rotation of the gear 202 rotates the gear 204 coupled to the cam 210. Rotation of the cam 210 induces a slider member 212 to move in either a first direction or a second direction depending on a direction of rotation of the cam 210. Referring to FIG. 17, the slider member 212 is illustrated at a maximum upward position. Referring to FIG. 18, the slider member 212 is illustrated at a maximum downward position.

Figure 14:
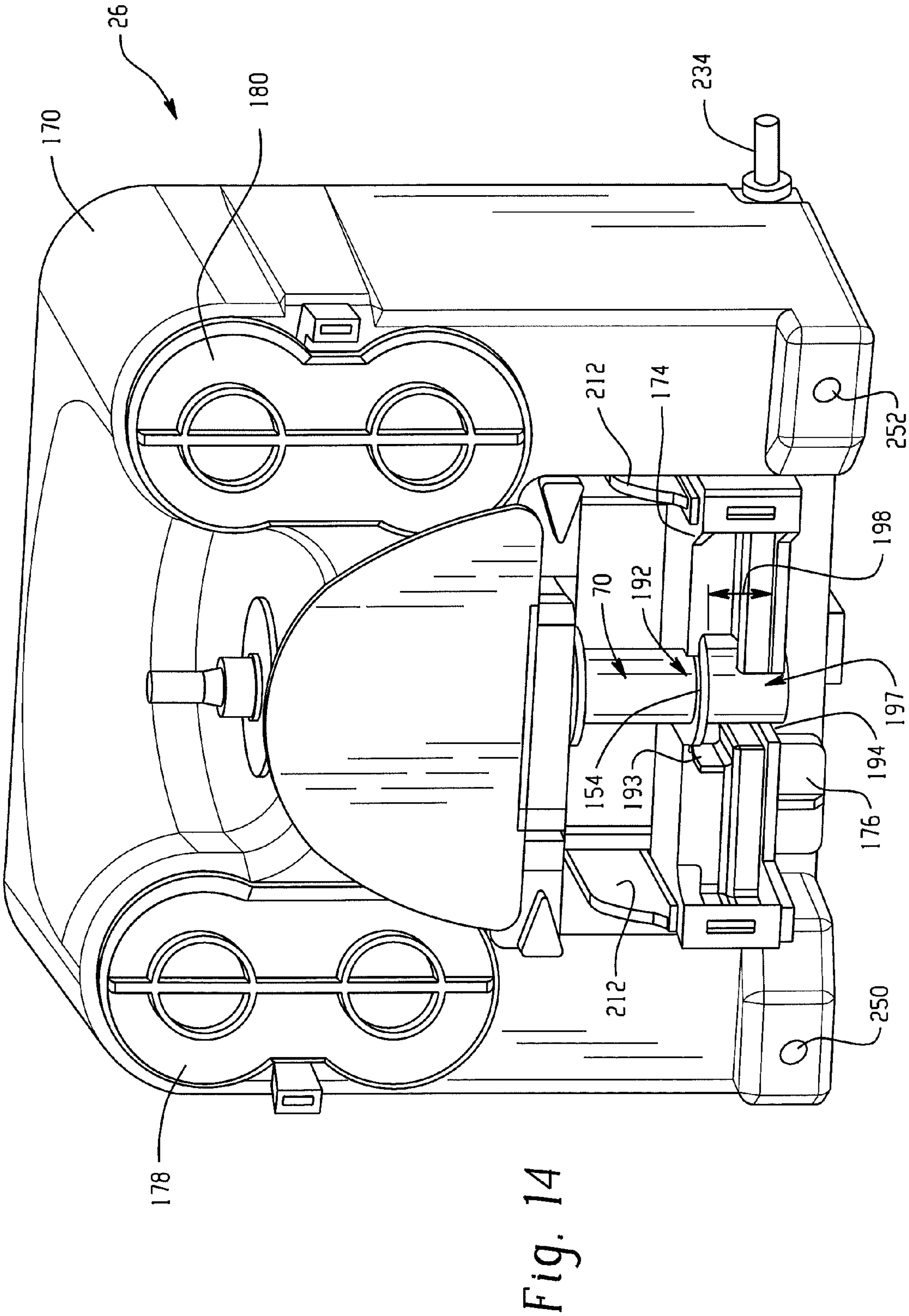
FIG. 14 is a front isometric view schematic of a pumping assembly and a chassis portion utilizable in the pumping dispenser of FIG. 1 with a slidable spacer portion in a first position.

Referring to FIG. 14, the actuator plate 174 is movably captivated by the chassis portion 26 and is provided to move the extension nozzle 70 in first and second directions for actuating the pump 60. The actuator plate 174 is fixedly attached to the slider member 212, which moves upwardly or downwardly responsive to first and second rotational directions respectively, of the motor 228 (illustrated in FIGS. 5, 17, and 18). The actuator plate 174 has an aperture 192 extending therethrough for receiving the extension nozzle 70 therethrough. The actuator plate 174 has first and second finger portions 193, 194 adjacent the aperture 192 separated by a gap therebetween. Ring portion 154 of extension nozzle 70 is disposed between finger portions 193, 194. When the actuator plate 174 is moved upwardly, the finger portion 194 contacts the ring portion 154 of the extension nozzle 70 to move the extension nozzle 70 upwardly to actuate the pump 60 for pumping liquid or foam out of the extension nozzle 70. When the actuator plate 174 is moved downwardly, the finger portion 193 contacts the ring portion 154 of the extension nozzle 70 to move the extension nozzle 70 downwardly to urge the pump 60 to receive additional liquid from the container 72 therein.

The slidable spacer portion 176 is movably captivated by the chassis portion 26 and is provided to adjust an amount of liquid or foam dispensed by the pump 60, by adjusting an amount of linear travel of the extension nozzle 70. The slidable spacer portion 176 is configured to be slid by a user between first and second operational positions. Referring to FIG. 14, when the slidable spacer portion 176 is in the first operational position not disposed in a gap 197 between the actuator plate finger portions 193, 194 and the ring portion 154 of the extension nozzle 70, the actuator plate 174 can move the extension nozzle 70 a first predetermined distance in the first direction (upwardly in FIG. 14) to induce the pump 60 to output a first predetermined amount of liquid or foam. The first predetermined distance is controlled by the gap 198 between the topside of actuator plate finger portion 194 and the underside of ring portion 154, which provides for a degree of lost motion between the topside of actuator plate finger portion 194 and the underside of ring portion 154 as the actuator plate 174 is driven upward to move the extension nozzle 70. Referring to FIG. 15, when the slidable spacer portion 176 is in the second operational position disposed in the gap 197 between the actuator plate finger portions 193, 194 and the ring portion 154 (see FIG. 14), of the extension nozzle 70, the actuator plate 174 can move the extension nozzle 70 a second predetermined distance in the first direction to induce the pump 60 to output a second predetermined amount of liquid or foam. The second predetermined distance is controlled by the gap 199 between the topside of a spacer plate 177 of spacer portion 176 and the underside of ring portion 154 as the actuator plate 174 is driven upward along with spacer plate 177 and spacer portion 176 to move the extension nozzle 70. The spacer plate 177 is arranged on spacer portion 176 so as to reduce a portion of the gap 198 when spacer portion 176 is slid into the gap 197 between the actuator plate finger portions 193, 194 and the ring portion 154. The gap 199 is less than the gap 198, which results in less lost motion when slidable spacer portion 176 is disposed as illustrated in FIG. 15, which in turn results in the second predetermined distance being greater than the first predetermined distance. As a result, the second predetermined amount of liquid or foam is greater than the first predetermined amount of liquid or foam.

Figure 16:
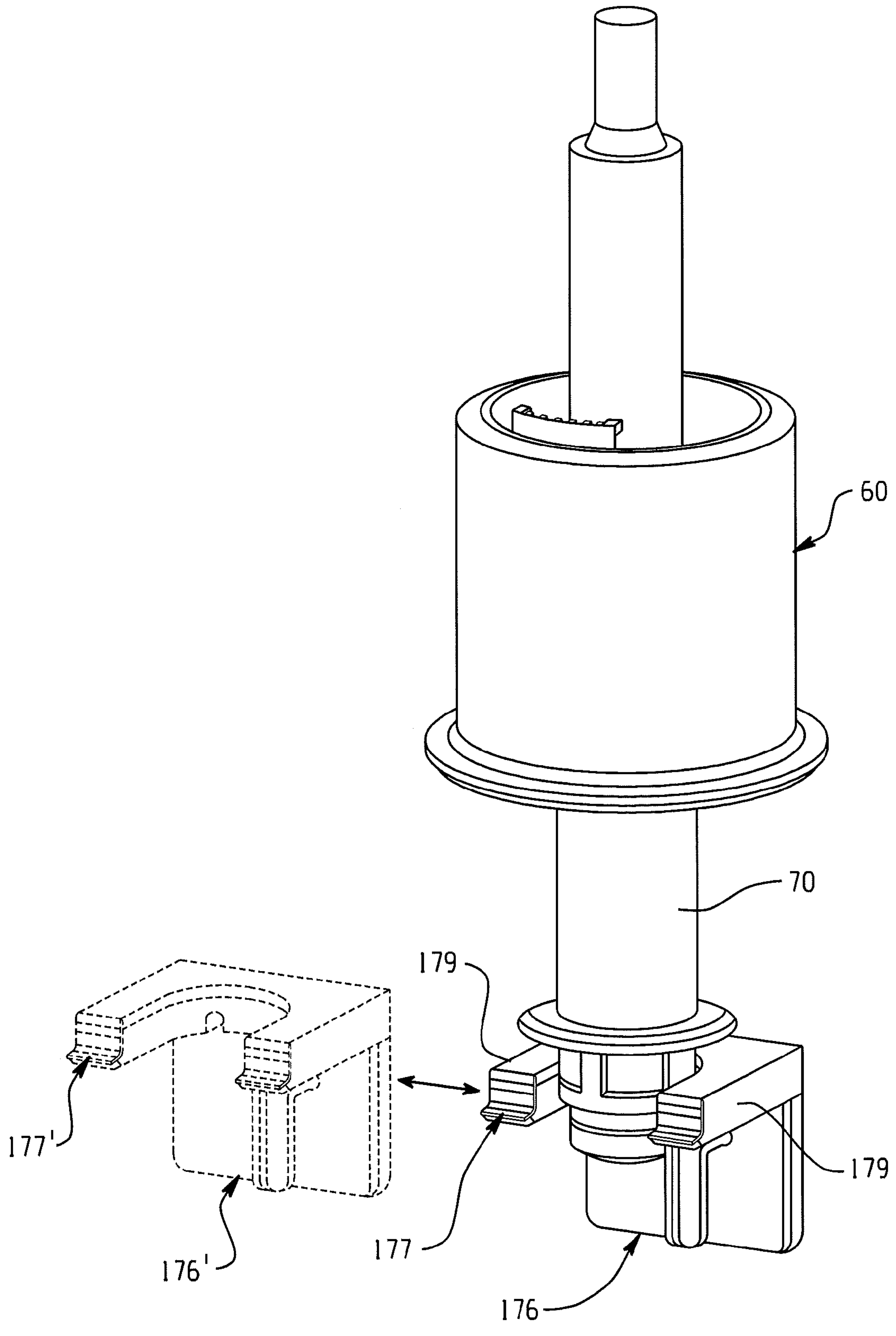
FIG. 16 is a front isometric view schematic of a pump and the slidable spacer portion of FIGS. 14 and 15 with the slidable spacer portion depicted in dashed line and solid line fashion to denote the first and second positions, respectively.

The first and second operational positions of slidable spacer portion 176 are best seen by referring now to FIG. 16, which depicts the first operational position in dashed line fashion (referenced by 176' in FIG. 16) and the second operational position in solid line fashion (referenced by 176 in FIG. 16). In the first operational position, spacer plate 177 of spacer portion 176 is disposed for non-engagement with ring portion 154 of extension nozzle 70, and in the second operational position, spacer plate 177 is disposed for engagement with ring portion 154. As can be seen, side legs 179 of spacer plate 177 of spacer portion 176 straddle the nozzle 70 of the pump 60 when the slidable spacer portion 176 is in the second operational position, thereby creating an interference that prevents the slidable spacer portion 176 from freely sliding from one of the first and second operational position to the other when the pump 60 is installed in the chassis portion 26, as illustrated in FIGS. 14 and 15. Thus, slidable spacer portion 176 can be slid from one of the first and second operational position to the other only when the pump 60 is removed from the chassis portion 26, such as when removed by a maintenance person for example who is desirous of changing the amount of liquid or foam to be dispensed from the dispenser 10.

From the foregoing, it will be appreciated that in response to the spacer portion 176 being disposed at the first operational position, and in response to the actuator plate 174 being moved in the first direction, the extension nozzle 70 is displaced a first distance by engagement of the finger portion 194 with the ring portion 154, and in response to the spacer portion 176 being disposed at the second position, and in response to the actuator plate 174 being moved in the first direction, the extension nozzle 70 is displaced a second distance by engagement of the spacer plate 177 with the ring portion 154, the second distance being greater than the first distance as discussed above.

The battery covers 178, 180 are provided to enclose the batteries 236, 238, 240, 242 within the chassis portion 26.

Figure 5:
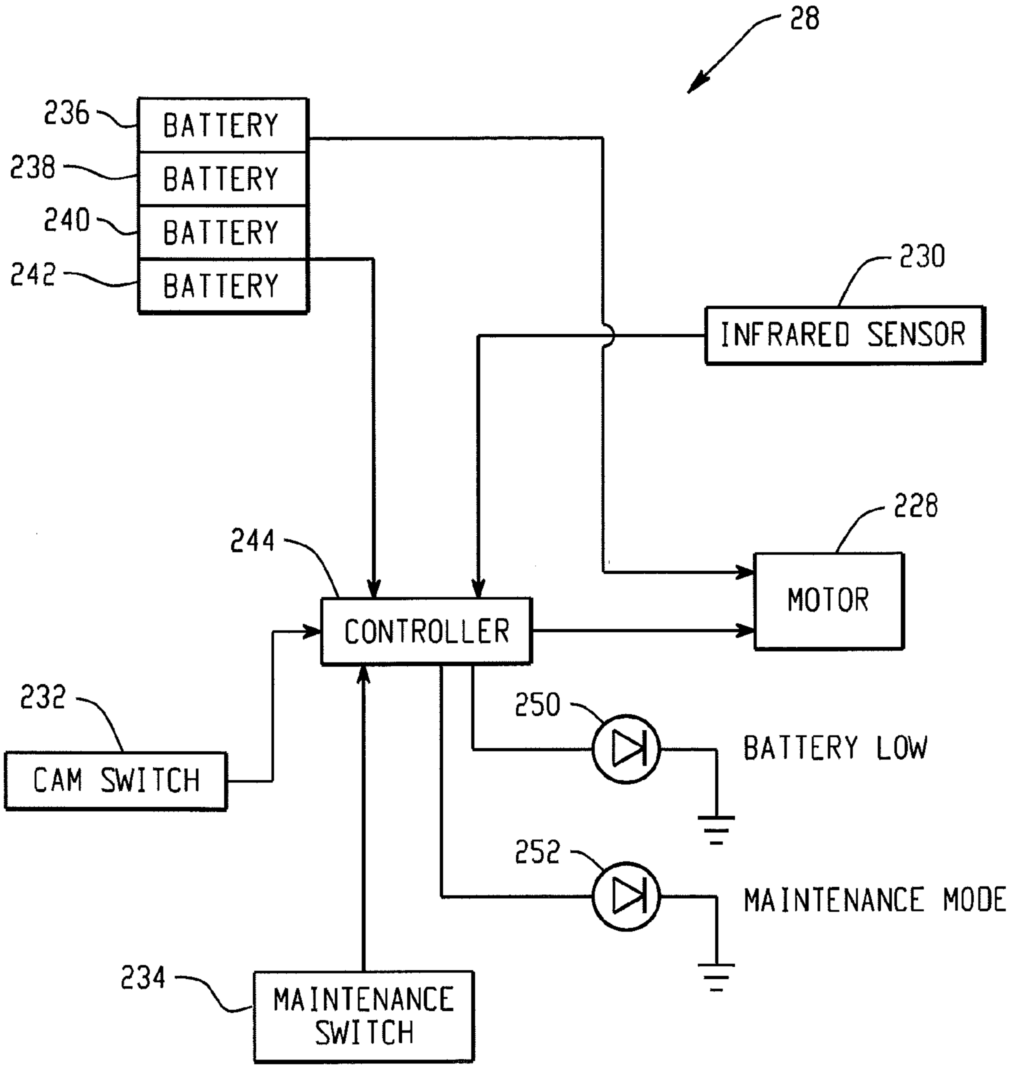
FIG. 5 is a circuit schematic of a control circuit utilizable in the pumping dispenser of FIG. 1.

Referring to FIG. 5, the control circuit 28 for controlling operation of the pumping dispenser 10 is illustrated. The control circuit 28 includes a motor 228, an infrared sensor 230, a cam switch 232, a maintenance switch 234, batteries 236, 238, 240, 242, a controller 244, and light emitting diodes (LEDs) 250, 252.

The motor 228 is configured to drive the drive assembly 172 for moving the actuator plate 174 in first and second directions to actuate the pump 60, responsive to control signals from the controller 244. The motor 228 is electrically coupled to the controller 244 and to the batteries 236, 238, 240, 242. The motor 228 is disposed in the chassis portion 26.

The infrared sensor 230 is provided to detect when an object, such as a users' hand, is disposed under the pumping dispenser 10. In particular, the infrared sensor 230 generates an output signal when an object is detected under the pumping dispenser 10, which is received by the controller 244. The infrared sensor 230 is disposed on a bottom portion of the chassis portion 26.

Referring to FIG. 17, the cam switch 232 is provided to detect when the cam 210 is rotated to a position such that the slider portion 212 is disposed at a maximum downwardly position. In particular, the cam switch 232 has a closed operational position when the cam 210 is rotated to a position such that the slider portion 212 is at the maximum downwardly position, which is detected by the controller 244.

Referring again to FIGS. 1 and 5, the maintenance switch 234 is provided to place the controller 244 in a maintenance operational mode. In particular, when the maintenance switch 234 has a first operational position, the controller 244 enters a maintenance operational mode. In the maintenance operational mode, the controller 244 de-activates or disables the motor 228 for a predetermined amount of time prior to opening the housing cover 20 to allow a user sufficient time to replace the pumping assembly 24 or to clean the pumping dispenser 10 without dispensing liquid or foam therefrom. When the maintenance switch 234 has a second operational position, the controller 244 exits the maintenance operational mode and allows activation of the motor 228 in response to receiving a signal from the infrared sensor 230. As illustrated, the maintenance switch 234 is coupled to the chassis 26 and extends through an aperture in the housing cover 20 in such a manner as to be conspicuously visible. Accordingly, a user can contact the maintenance switch 234 without opening the housing cover 20.

The batteries 236, 238, 240, 242 provide operational voltage for the controller 244, the infrared sensor 230, and the motor 228. The batteries 236, 238, 240, 242 are disposed in the chassis portion 26.

The controller 244 is provided to control operation of the pumping dispenser 10. The controller 244 is electrically coupled to the batteries 236, 238, 240, 242, the infrared sensor 230, the motor 228, the cam switch 232, the maintenance switch 234, and the LEDs 250, 252. The controller 244 is disposed on a circuit board within the pumping dispenser 10. When the controller 244 receives a signal from the infrared sensor 230, the controller 244 generates control signals which induce the motor 228 to move the extension nozzle 70 in a first direction, to induce the pump 60 to output liquid or foam through the extension nozzle 70. After the motor 228 has moved to the extension nozzle 70 a predetermined distance, the motor generates control signals which induce the motor 228 to move the extension nozzle in a second direction, which induces the pump 60 to receive additional liquid therein from the container 72. When the controller 244 enters a maintenance operational mode, the controller 244 generates a signal for inducing the LED 252 to emit light. Alternately, when the controller 244 exits the maintenance operational mode, the controller 244 stops generating the signal to the LED 252 which causes the LED 252 to stop emitting light. When the controller 244 detects that the batteries 236, 238, 240, 242 are outputting a voltage level less than a threshold voltage level, the controller 244 generates a signal to induce the LED 250 to emit light. Alternately, when the controller 244 detects that the batteries 236, 238, 240, 242 are outputting a voltage level greater than or equal to the threshold voltage level, the controller 244 stops generating the signal to the LED 250 which causes the LED 252 stop emitting light.

Figure 21:
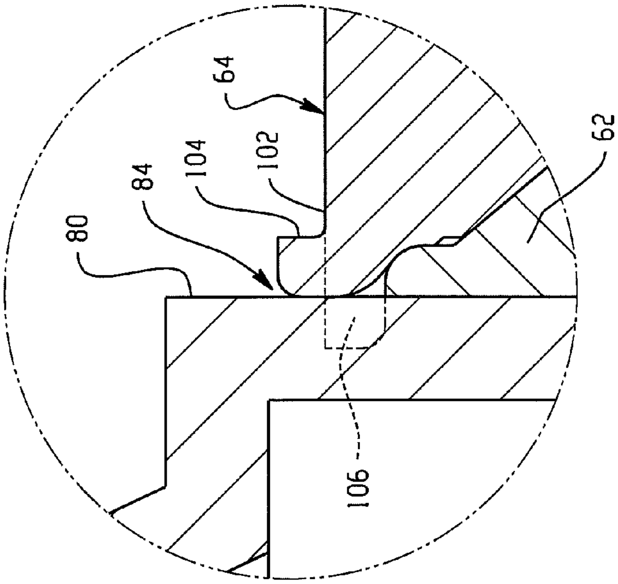
FIG. 21 is an enlarged view of a portion of FIG. 20.
Figure 20:
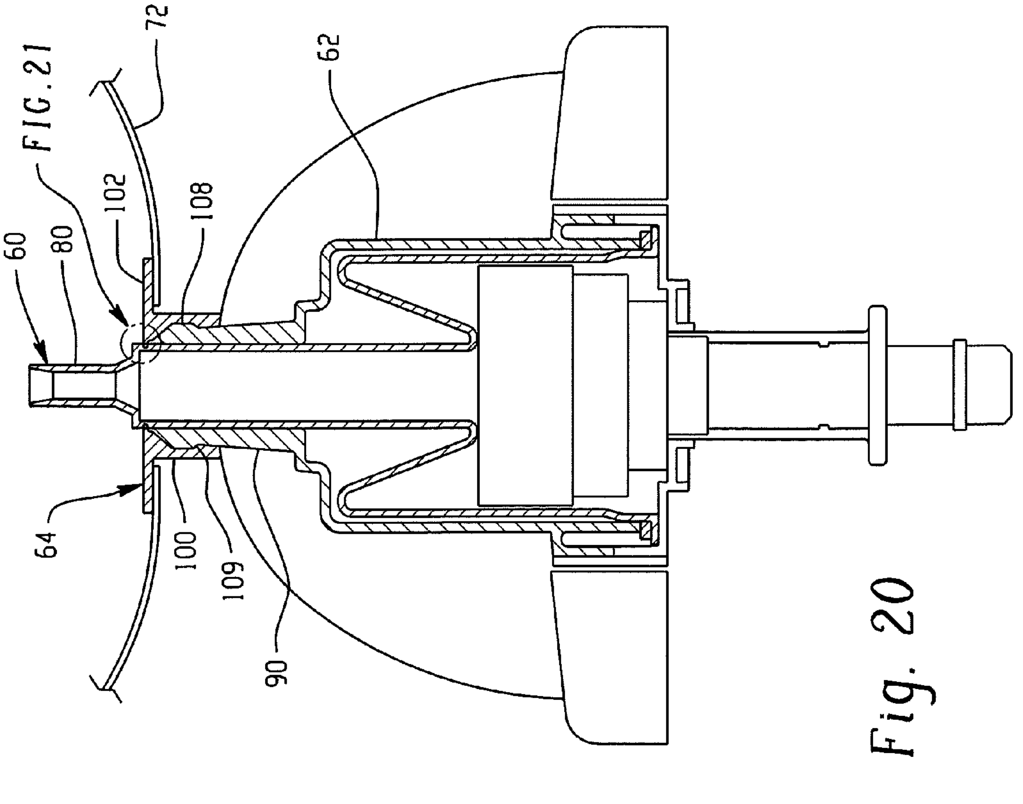
FIG. 20 is a section view schematic of a pumping assembly utilizable in the pumping dispenser of FIG. 1.

Referring now to FIGS. 20 and 21, a sealing arrangement between container fitment 64 and inlet nozzle 80 of pump 60, and between container fitment 64 and inlet portion 90 of pump cover 62, is depicted as an alternative to that depicted and discussed above in relation to FIG. 7. Here, rim portion 102 includes an inner circumferential flange 104/106 that engages in a cantilever-like deflection-fit or interference-fit sealing arrangement (deflected circumferential flange depicted in solid line fashion 104, and undeflected circumferential flange depicted in dotted line 106 fashion in FIG. 21) with the outer diameter of inlet nozzle 80 of pump 60, thereby providing a first seal 84 to deter or prevent leakage of liquid from container 72. In addition, tubular portion 100 includes an inner circumferential lip 108 that engages in a snap-fit, click-fit or interference-fit arrangement with an outer undercut 109 in the inlet portion 90 of pump cover 62, thereby providing a second seal to deter or prevent leakage of liquid from container 72.

In an embodiment, a third seal is provided between the outer diameter (OD) of nozzle 80 of pump 60, and the inner diameter (ID) of inlet portion 90 of pump cover 62. Here, the third seal may be provided with nominal OD and ID dimensions of nozzle 80 and inlet portion 90 creating an interference fit, or with the minimum interference fit between the OD and ID with OD/ID tolerances considered (that is, considering minimum and maximum tolerance conditions) creating an interference fit. In an embodiment, the minimum interference fit with OD/ID tolerances considered is 0.001 inches.

Alternative embodiments of the invention may employ the first, second and third seal, or any combination of any of the first, second and third seals. For example, a single seal or a double seal of any of the first, second and third seals may be employed, or a triple seal of all three first, second and third seals may be employed.

Whatever combination of first, second and third seals are employed, a first embodiment is arranged so that the pump assembly 24 is securely coupled to the container 72 in such a manner as to make it very difficult to remove the pump assembly 24 from the container 72 without damaging either the container 72 or the pump assembly 24. In this manner, the pump assembly 24 is replaced with each replacement of a refilled container 72. Stated alternatively, the container 72 is securely coupled to the pump assembly 24 in such a manner as to cause damage to one or both of the container 72 and the pump assembly 24 in response to separation or attempted separation of the container 72 from the pump assembly 24.

In another embodiment, however, container fitment 64 can be fixedly but removably attached to pump 60 and pump cover 62, thereby enabling a replacement container of liquid to be placed in dispenser 10 without the need to replace the pump assembly 24 when the original container is depleted of its contents.

As discussed earlier in relation to FIG. 7 but with reference still to FIGS. 20 and 21, the rim portion 102 is fixedly attached to the container 72 such that an aperture in the container 72 communicates with an aperture extending through the tubular portion 100. In an embodiment, the underside of rim portion 102 is heat staked to an inside portion of the container 72, which encloses the rim portion 102.

While an alternative sealing arrangement has been discussed herein with a deflection-fit flange, or a lip and undercut arrangement disposed on a specified part, it will be appreciated that such arrangement of features can be reversed with respect to the specified part, and still be within the scope of the invention disclosed herein. In addition, other sealing arrangements such as a one-way attachment quick connect is also contemplated and considered within the scope of the invention disclosed.

The pumping dispenser and the pumping assembly utilized in the pumping dispenser provide a substantial advantage over other dispensers and assemblies. In particular, the pumping dispenser and the pumping assembly provide a technical effect of selectively switching from one amount of liquid dispensing to another, of controllably deactivating a dispensing motor to replace a depleted liquid container, and/or of utilizing a placard portion that is viewable from outside of the pumping dispenser that has information associated with the liquid held within a container of the pumping assembly. As a result, a user of the pumping dispenser can easily determine the type of liquid, or the efficacy of the liquid for a particular purpose, or an attribute of the liquid, or a type of facility that the liquid can be used within, without having to either open the pumping dispenser or activate the pumping dispenser.

While the invention has been described with reference to exemplary embodiments, it will be understood by those skilled in the art that various changes may be made and equivalent elements may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying this invention, but that the invention will include all embodiments falling within the scope of the appended claims. Moreover, the use of the terms, first, second, etc. are used to distinguish one element from another. Furthermore, the use of the terms a, an, etc. do not denote a limitation of quantity, but rather denote the presence of at least one of the referenced items.

What is claimed is:

1. A dispenser apparatus for dispensing a flowable material, the apparatus comprising:

a pumping assembly comprising a pump, a pump cover, a chassis portion, and a collar portion;

the collar portion being removably attached to the pump cover and the chassis portion, the collar portion comprising first and second flexible arms disposed in spring-bias opposition to one another, the first and second flexible arms having first and second engagement features, respectively, the first and second engagement features being removably attached to third and fourth engagement features, respectively, of the chassis portion;

at least a portion of the pump being disposed within the pump cover; and the pump being captivated between the pump cover and the collar portion.

2. The dispenser apparatus of claim 1, further comprising:

a container holding the flowable material therein; and a placard portion configured for displaying viewable information thereon associated with the flowable material, the pumping assembly placard portion being attached to the container.

3. The device of claim 2, wherein the viewable information on the placard portion comprises one of a plurality of colors indicating at least one of a type of the flowable material, an efficacy of the flowable material for a particular purpose, an attribute of the flowable material, and a type of facility that the flowable material can be used.

4. The device of claim 2, wherein the flowable material comprises at least one of a liquid soap, a liquid lotion, a sanitizer liquid, and an antimicrobial liquid.

5. The dispenser apparatus of claim 1, wherein:

the pump cover comprises a placard portion configured for displaying viewable information thereon associated with the flowable material.

6. The dispenser apparatus of claim 1, wherein:

the pumping assembly further comprises a container holding the flowable material therein, the container being removably coupled to at least one of the pump and the pump cover via a seal.

7. The dispenser apparatus of claim 1, wherein:

the collar portion is removably attached to the pump cover via at least one snap-fit engagement feature.

8. The dispenser apparatus of claim 1, further comprising:

a housing cover movably coupled to the chassis portion;

wherein the pump cover comprises a placard portion configured for displaying viewable information thereon associated with the flowable material; and wherein the housing cover comprises a transparent or translucent region for allowing viewing of the placard portion.

9. The dispenser apparatus of claim 1, wherein:

the pumping assembly further comprises a container holding the flowable material therein, the container being securely coupled to at least one of the pump and the pump cover via a seal in such a manner as to cause damage to at least one of the container and the pumping assembly in response to separation or attempted separation of the container from the pumping assembly.

10. A dispenser apparatus for dispensing a flowable material, the apparatus comprising:

a chassis portion comprising an actuator plate comprising first and second actuator finger portions, the actuator plate being movably captivated by the chassis portion and movable in a first direction and a second direction;

a pump comprising a nozzle comprising an engagement feature disposed between the first and second actuator finger portions such that movement of the actuator plate in the first direction causes the nozzle via the engagement feature to move in the first direction, and such that movement of the actuator plate in the second direction causes the nozzle via the engagement feature to move in the second direction.

11. The dispenser apparatus of claim 10, wherein:

the chassis portion comprises a movable spacer portion comprising a spacer plate, the spacer portion being movably captivated by the chassis portion and movable to a first position and to a second position;

in response to the spacer portion being disposed at the first position, the spacer plate is disposed for non-engagement with the nozzle engagement feature; and in response to the spacer portion being disposed in the second position, the spacer plate is disposed for engagement with the nozzle engagement feature.

12. The dispenser apparatus of claim 11, wherein:

in response to the spacer portion being disposed at the first position, and in response to the actuator plate being moved in the first direction, the nozzle is displaced a first distance by engagement of the first finger portion with the nozzle engagement feature; and in response to the spacer portion being disposed at the second position, and in response to the actuator plate being moved in the first direction, the nozzle is displaced a second distance by engagement of the spacer plate with the nozzle engagement feature, the second distance being greater than the first distance.

13. The dispenser apparatus of claim 11, wherein:

the spacer plate comprises at least one side leg disposed at a side of the nozzle of the pump such that the at least one side leg interferes with the nozzle of the pump when the spacer portion is urged to change position from one of the first and second position to the other, thereby preventing movement of the spacer portion from one of the first and the second position to the other when the pumping assembly is attached to the chassis portion.

* * * * *